(12) United States Patent
White et al.

(10) Patent No.: US 11,716,276 B2
(45) Date of Patent: Aug. 1, 2023

(54) DETECTING MISWIRINGS IN A SPINE AND LEAF TOPOLOGY OF NETWORK DEVICES

(71) Applicant: Juniper Networks, Inc., Sunnyvale, CA (US)

(72) Inventors: Russ White, Apex, NC (US); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 16/811,600

(22) Filed: Mar. 6, 2020

(65) Prior Publication Data

US 2021/0281506 A1 Sep. 9, 2021

(51) Int. Cl.
*H04L 45/02* (2022.01)
*H04L 41/0631* (2022.01)
*H04L 41/12* (2022.01)
*H04L 45/00* (2022.01)

(52) U.S. Cl.
CPC .......... *H04L 45/02* (2013.01); *H04L 41/0631* (2013.01); *H04L 41/12* (2013.01); *H04L 45/20* (2013.01)

(58) Field of Classification Search
None
See application file for complete search history.

(56) References Cited

U.S. PATENT DOCUMENTS

| 8,165,121 | B1 | 4/2012 | Singh | |
| 9,553,796 | B2* | 1/2017 | Hui | H04L 45/18 |
| 9,602,387 | B2 | 3/2017 | Wood | |
| 9,648,547 | B1* | 5/2017 | Hart | H04L 41/12 |
| 2012/0151026 | A1* | 6/2012 | Chen | H04L 41/12 709/223 |

(Continued)

FOREIGN PATENT DOCUMENTS

| CN | 105743691 A | 7/2016 |
| CN | 108683602 A | 10/2018 |

OTHER PUBLICATIONS

Extended European Search Report for Application No. EP21159335.5, dated Aug. 4, 2021, 9 pages.

(Continued)

*Primary Examiner* — Derrick W Ferris
*Assistant Examiner* — Keith Follansbee
(74) *Attorney, Agent, or Firm* — Harrity & Harrity, LLP

(57) ABSTRACT

A network device may receive topology data identifying a spine and leaf topology of network devices, and may set link metrics to a common value to generate modified topology data. The network device may remove data identifying connections from leaf network devices to any devices outside the topology from the modified topology data to generate further modified topology data, and may process the further modified topology data, with a model, to determine path data identifying paths to destinations. The network device may determine particular path data identifying shorter paths and longer paths to corresponding destinations, and may determine hop counts associated with the paths. The network device may determine whether the hop counts are all odd values, all even values, or odd and even values, and may perform actions based on whether the hop counts are all odd values, all even values, or odd and even values.

20 Claims, 18 Drawing Sheets

(56) References Cited

U.S. PATENT DOCUMENTS

| | | |
|---|---|---|
| 2014/0269413 A1 | 9/2014 | Hui et al. |
| 2017/0163524 A1* | 6/2017 | Rajendran ............. H04L 45/122 |
| 2017/0222867 A1* | 8/2017 | Masse ..................... H04L 41/24 |
| 2018/0026810 A1* | 1/2018 | Manthiramoorthy ... H04L 43/08 370/249 |
| 2018/0026872 A1 | 1/2018 | Manthiramoorthy et al. |
| 2018/0048666 A1* | 2/2018 | Alderson ................ H04L 45/20 |

OTHER PUBLICATIONS

"RIFT: Routing in Fat Trees draft-ietf-rift-rift-10" RIFT Working Group, A. Przygienda et al. Jan. 29, 2020, 160 pages.

* cited by examiner

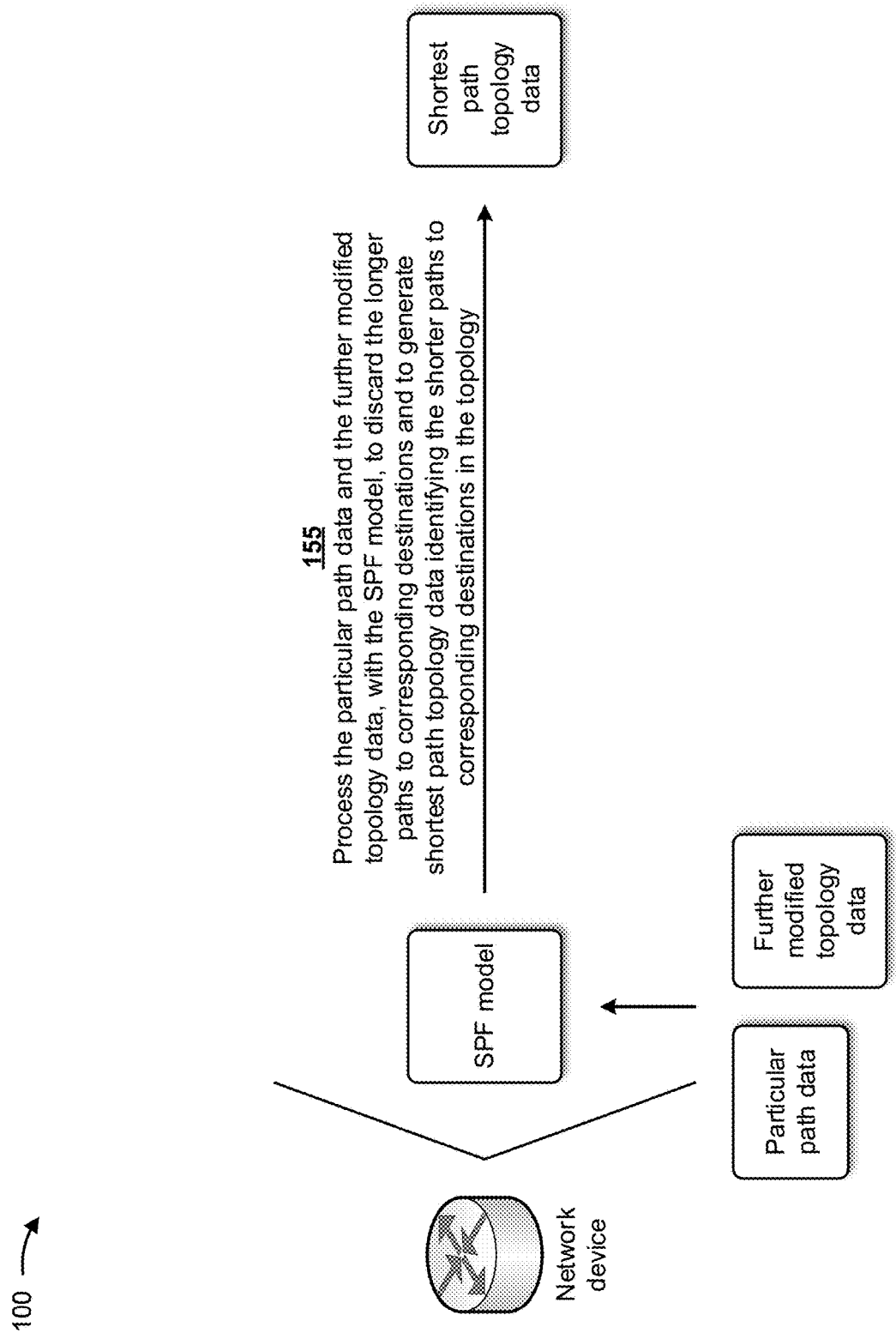

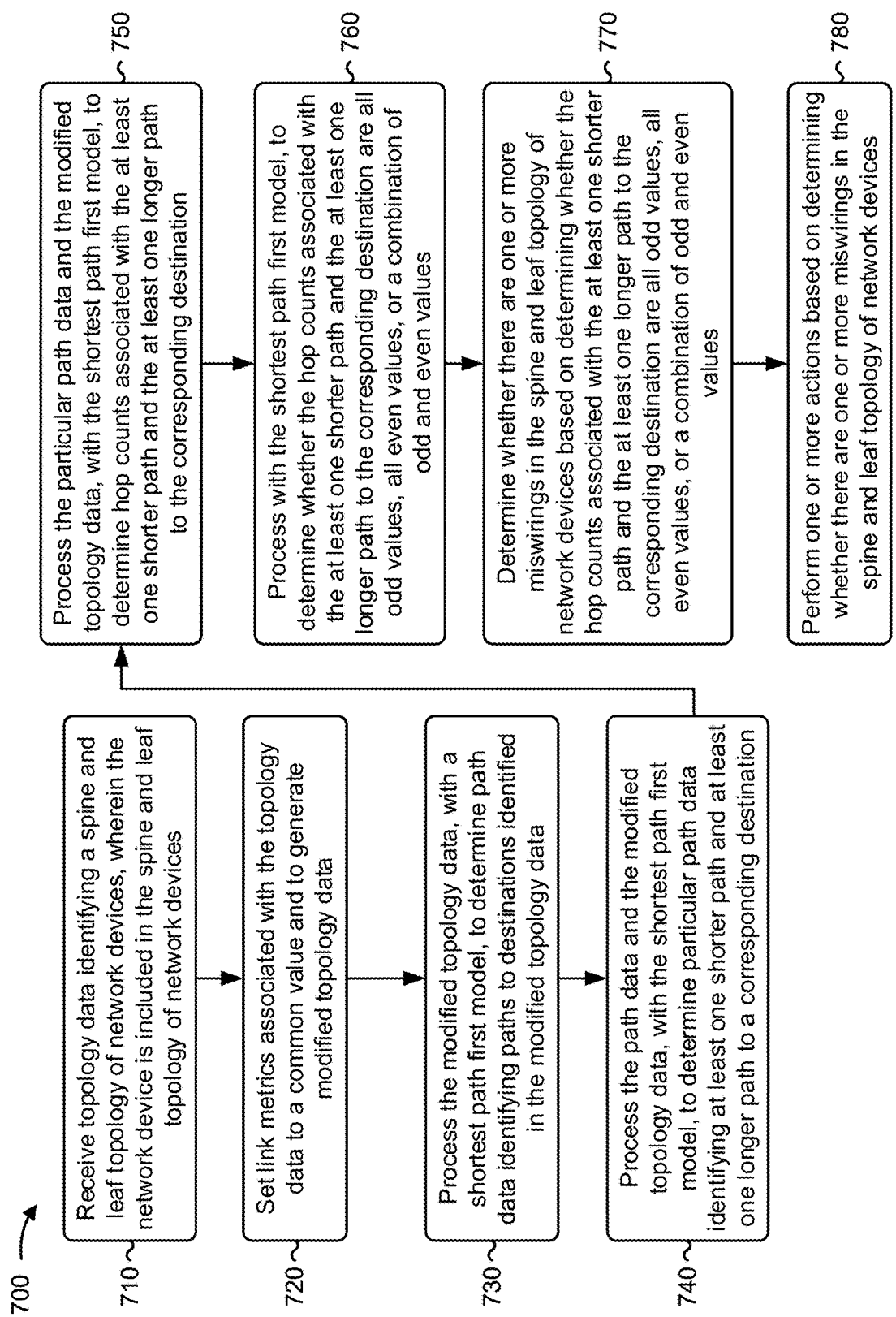

DETECTING MISWIRINGS IN A SPINE AND LEAF TOPOLOGY OF NETWORK DEVICES

BACKGROUND

A spine and leaf topology of network devices is a multi-layer data center network topology that includes leaf network devices (e.g., to which servers and storage connect) and spine network devices (e.g., to which leaf network devices connect). The leaf network devices may mesh into a spine to form an access layer that delivers network connection points for servers.

SUMMARY

According to some implementations, a method may include receiving topology data identifying a spine and leaf topology of network devices, and setting link metrics associated with the topology data to a common value and to generate modified topology data. The method may include removing data identifying connections to any devices outside the spine and leaf topology from the modified topology data to generate further modified topology data, and processing the further modified topology data, with a shortest path first model, to determine path data identifying paths to destinations identified in the further modified topology data. The method may include processing the path data and the further modified topology data, with the shortest path first model, to determine particular path data identifying shorter paths and longer paths to corresponding destinations, and processing the particular path data and the further modified topology data, with the shortest path first model, to determine hop counts associated with the shorter paths and the longer paths to corresponding destinations. The method may include processing the hop counts, with the shortest path first model, to determine whether the hop counts associated with the shorter paths and the longer paths to corresponding destinations are all odd values, all even values, or a combination of odd and even values, and performing one or more actions based on determining whether the hop counts associated with the shorter paths and the longer paths to corresponding destinations are all odd values, all even values, or a combination of odd and even values.

According to some implementations, a network device may include one or more memories, and one or more processors to receive topology data identifying a spine and leaf topology of network devices, and set link metrics associated with the topology data to a common value and to generate modified topology data. The one or more processors may process the modified topology data, with a directed acyclic graph model, to generate a directed acyclic graph identifying paths to destinations identified in the modified topology data. The one or more processors may process the directed acyclic graph to determine whether hop counts associated with paths to corresponding destinations are all odd values, all even values, or a combination of odd and even values, and may perform one or more actions based on determining whether the hop counts associated with the paths to corresponding destinations are all odd values, all even values, or a combination of odd and even values.

According to some implementations, a non-transitory computer-readable medium may store one or more instructions that, when executed by one or more processors of a network device, may cause the one or more processors to receive topology data identifying a spine and leaf topology of network devices, and set link metrics associated with the topology data to a common value and to generate modified topology data. The one or more instructions may cause the one or more processors to process the modified topology data, with a shortest path first model, to determine path data identifying paths to destinations identified in the modified topology data. The one or more instructions may cause the one or more processors to process the path data and the modified topology data, with the shortest path first model, to determine particular path data identifying at least one shorter path and at least one longer path to a corresponding destination, and process the particular path data and the modified topology data, with the shortest path first model, to determine hop counts associated with the at least one shorter path and the at least one longer path to the corresponding destination. The one or more instructions may cause the one or more processors to process with the shortest path first model, to determine whether the hop counts associated with the at least one shorter path and the at least one longer path to the corresponding destination are all odd values, all even values, or a combination of odd and even values, and determine whether there are miswirings in the spine and leaf topology of network devices based on determining whether the hop counts associated with the at least one shorter path and the at least one longer path to the corresponding destination are all odd values, all even values, or a combination of odd and even values. The one or more instructions may cause the one or more processors to perform one or more actions based on determining whether there are miswirings in the spine and leaf topology of network devices.

BRIEF DESCRIPTION OF THE DRAWINGS

FIGS. 5-7 are flow charts of example processes for detecting miswirings in a spine and leaf topology of network devices.

DETAILED DESCRIPTION

Figure 1A:
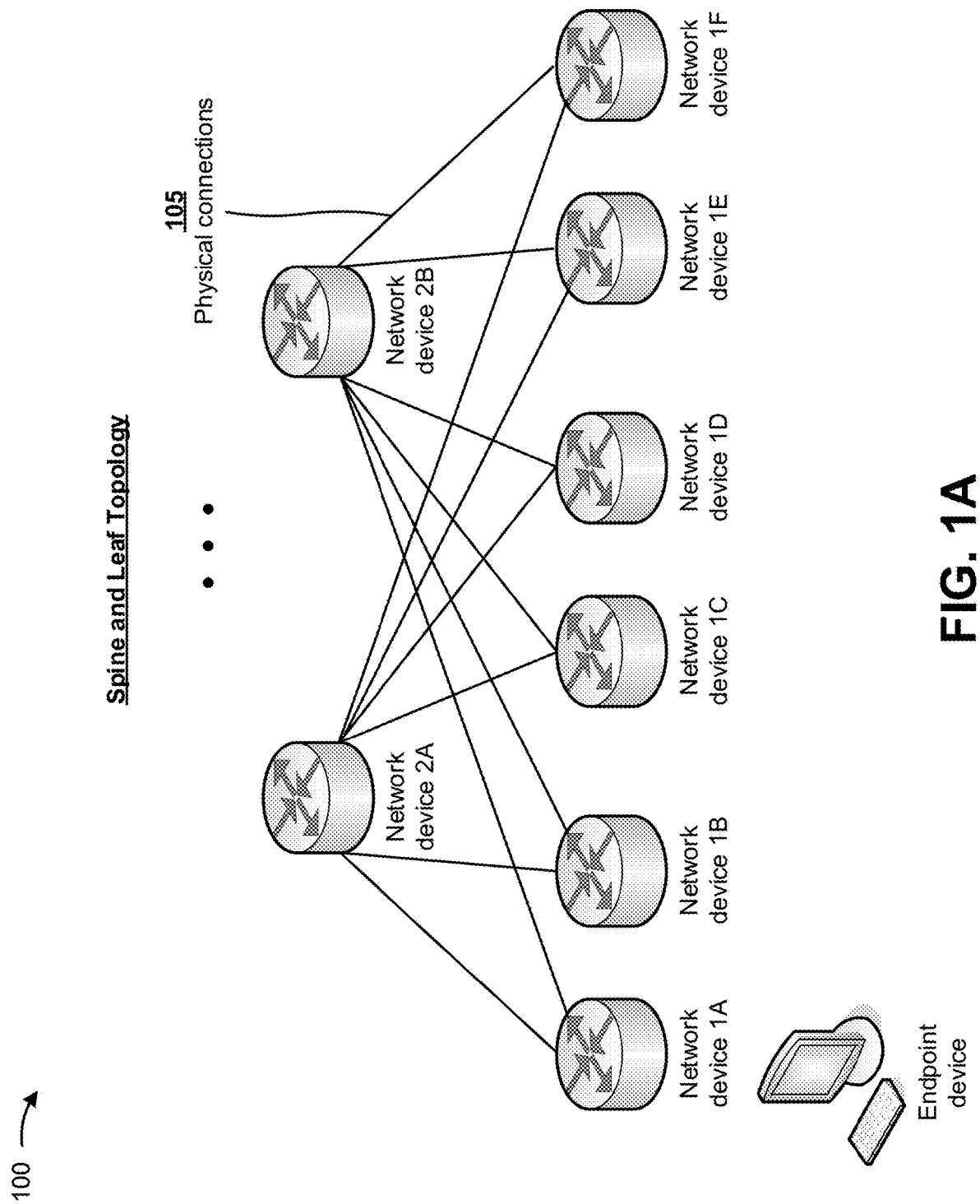
FIGS. 1A-IL are diagrams of one or more example implementations described herein.

The following detailed description of example implementations refers to the accompanying drawings. The same reference numbers in different drawings may identify the same or similar elements.

Many datacenters deploy dense spine and leaf network topologies. These network topologies have very well-defined connectivity and many flooding optimization techniques assume standard connectivity and/or topology. However, if there are miswirings between network devices of a spine and leaf network topology and/or incorrect connections across stages of the spine and leaf network topology, problems may occur for the flooding optimization techniques that result in a degraded flooding performance. Thus, current techniques for deploying spine and leaf network topologies waste computing resources (e.g., processing resources, memory resources, communication resources, and/or the like), networking resources, and/or the like associated with experiencing degraded flooding performance, losing traffic in a network, attempting to recover the lost traffic, and/or the like.

Some implementations described herein provide a network device that detects miswirings in a spine and leaf topology of network devices. For example, the network device may receive topology data identifying a spine and leaf topology of network devices, and may set link metrics associated with the topology data to a common value and to generate modified topology data. The network device may remove data identifying connections to devices outside the spine and leaf topology from the modified topology data to generate further modified topology data, and may process the further modified topology data, with a shortest path first model, to determine path data identifying paths to destinations identified in the further modified topology data. The network device may process the path data and the further modified topology data, with the shortest path first model, to determine particular path data identifying shorter paths and longer paths to corresponding destinations, and may process the particular path data and the further modified topology data, with the shortest path first model, to determine hop counts associated with the shorter paths and the longer paths to corresponding destinations. The network device may process the hop counts, with the shortest path first model, to determine whether the hop counts associated with the shorter paths and the longer paths to corresponding destinations are all odd values, all even values, or a combination of odd and even values, and may perform one or more actions based on determining whether the hop counts associated with the shorter paths and the longer paths to corresponding destinations are all odd values, all even values, or a combination of odd and even values. As the spine and leaf topology includes physical connections between network devices configured based on a defined system, the hop counts associated with shorter paths and the longer paths to the same destination should be all odd values or all even values. If the hop counts associated with shorter paths and the longer paths to the same destination include even a single odd value included with even values or even a single even value included with odd values, the network device may determine that there is one or more miswirings associated with one or more of the shorter paths and/or one or more of the longer paths.

In this way, the network device may detect miswirings in a spine and leaf topology of network devices. The network device may detect the miswirings without requiring any configuration and protocol changes. When there is a miswiring in the spine and leaf topology, the network device may detect the miswiring and may generate a warning about the miswiring so that the miswiring can be pro-actively corrected. This, in turn, conserves computing resources (e.g., processing resources, memory resources, communication resources, and/or the like), networking resources, and/or the like that would otherwise have been wasted in experiencing degraded flooding performance, losing traffic in a network, attempting to recover the lost traffic, and/or the like.

FIGS. 1A-1L are diagrams of one or more example implementations 100 described herein. As shown in FIGS. 1A-1L, an endpoint device (e.g., a server, a firewall, an edge device, and/or the like) may communicate and/or exchange traffic with a spine and leaf network topology of network devices. The spine and leaf network topology may include multiple network devices (e.g., routers, gateways, bridges, switches, network interface controllers (NIC), and/or the like), such as a first network device (e.g., network device 1A), a second network device (e.g., network device 1B), a third network device (e.g., network device 2A), and/or the like. The eight network devices shown in FIGS. 1A-1L are provided merely as examples of network devices, and, in practice, the spine and leaf network topology may include additional network devices.

The spine and leaf network topology may include spine network devices and leaf network devices. The spine network devices may be network devices that connect one or more leaf network devices. Each spine network device may connect to one or more core network devices, one or more network devices outside of the spine and leaf network topology, and/or the like. The leaf network devices may be network devices that connect to endpoint devices (e.g., the leaf network devices may be IP reachable). Each leaf network device may be physically connected with each spine network device.

Leaf network devices may not be connected to other leaf network devices in a same tier (as explained below). Similarly, spine network devices may not be connected to other spine network devices in the same tier. However, a spine network device may be connected to another spine network device in another tier. If a leaf network device is connected to another leaf network device in the same tier, the connection may be a miswiring. Similarly, if a spine network device is connected to another spine network device in the same tier, the connection may be a miswiring. As described above, miswirings can result in degraded flooding performance, lost traffic, and/or the like.

As shown in FIG. 1A, and by reference number 105, the spine and leaf topology may include a plurality of physical connections (e.g., wires, cables, and/or the like) between network devices. The physical connections may allow for traffic to travel from one network device to another network device.

For example, network devices 1A-1F may be leaf network devices (e.g., network devices 1A-1F may receive traffic from the endpoint device). Network devices 2A and 2B may be spine network devices. Each leaf network device (e.g., each of network devices 1A-1F) may be connected to each spine network device (e.g. each of network devices 2A and 2B). Network devices 1A-1F may be in the same tier. As such, there may be no physical connections between network devices 1A-1F. Similarly, network devices 2A and 2B may be in the same tier and there may be no physical connections between network devices 2A and 2B.

In some implementations, there may be additional tiers or stages of network devices configured in a similar manner as the network devices described above. For example, there may be an additional tier of spine network devices. Each spine network device in the additional tier of spine network devices may be physically connected to each spine network device 2A and 2B.

Figure 1B:
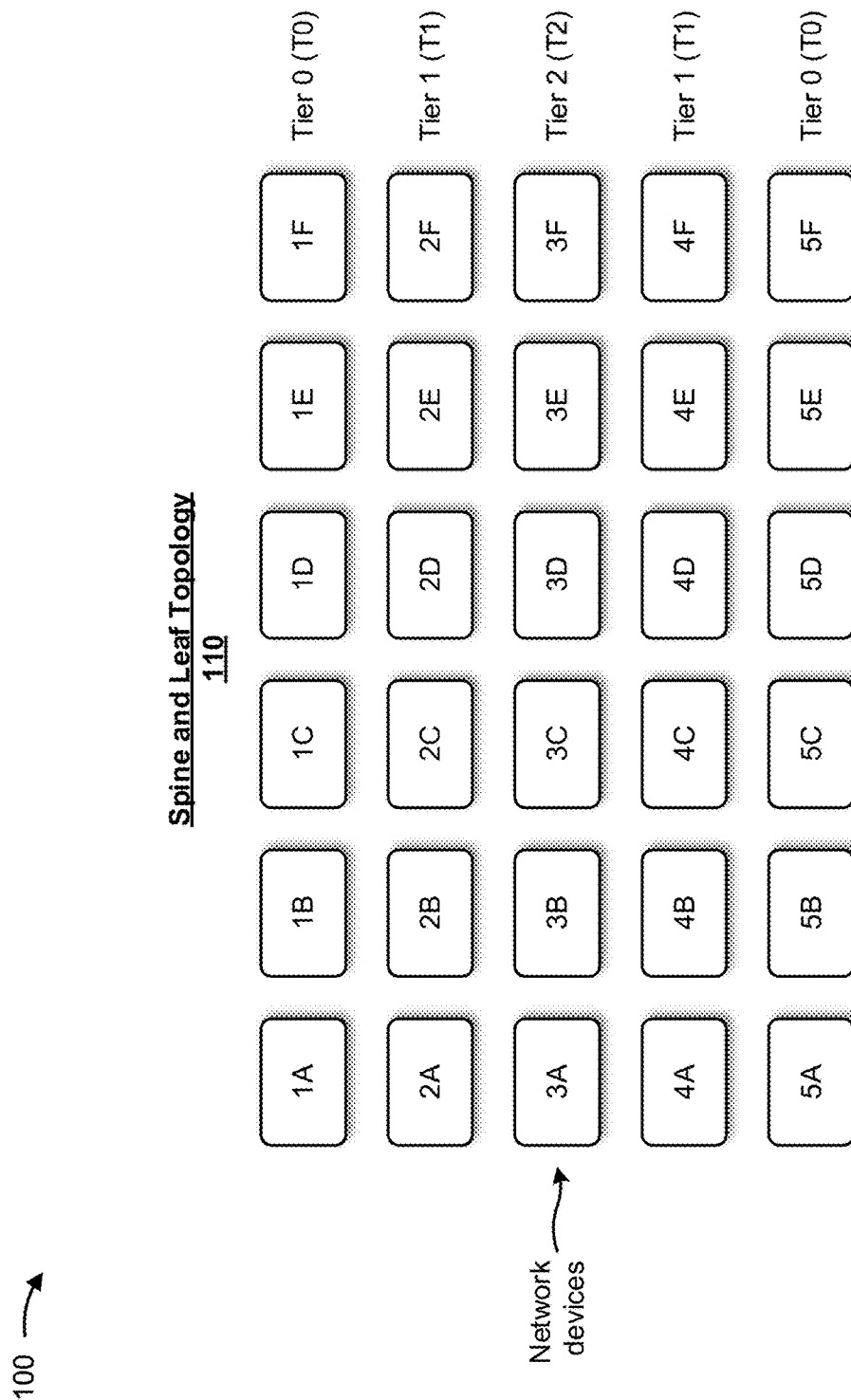

As shown in FIG. 1B, and by reference number 110, the spine and leaf topology may include a plurality of network devices (e.g., labeled as 1A, 1B, 2A, 2B, etc.) arranged in tiers (e.g., tier T0, tier T1, and tier T2). A tier may be a layer of network devices, a stage of network devices, and/or the like. FIG. 1B does not show the physical connections between the network devices. The physical connections may be configured in a manner similar to that described above with respect to FIG. 1A. Each network device may be physically connected to each network device in adjacent tiers. Network devices in the same tier may not be physically connected to each other.

For example, network device 5A may be physically connected to network device 4A, network device 4B, network device 4C, network device 4D, network device 4E, and network device 4F. Network device 5A may not be physically connected to network device 5B, network device 5C, network device 5D, network device 5E, or network device 5F. Network device 4A may be physically connected to network device 5A, network device 5B, network device 5C, network device 5D, network device 5E, network device 5F, network device 3A, network device 3B, network device 3C, network device 3D, network device 3E, and network device 3F. All network devices included in the spine and leaf topology may include physical connections configured in a similar manner.

Network devices in tier T0 (e.g., network devices 1A-1F and network devices 5A-5F) may be top of rack (ToR) network devices. Network devices in tier T0 may be connected to one or more endpoint devices. Network devices in tier T0 may be leaf network devices. Network devices in tiers T1 and T2 (e.g., network devices 2A-2F, network devices 3A-3F, and network devices 4A-4F) may be connected only to the other network devices in the spine and leaf topology. Network devices in tiers T1 and T2 may be spine network devices.

The spine and leaf topology may perform one or more link-state routing protocols, such as Open Shortest Path First (OSPF) protocol, Intermediate System to Intermediate System (ISIS) protocol, and/or the like. Each network device included in the spine and leaf topology may independently calculate paths for traffic through the spine and leaf topology to every possible destination in the spine and leaf topology, as described below.

Traffic being transmitted within the spine and leaf topology may be associated with a hop count. The hop count may indicate the number of transmissions of traffic from one network device within the spine and leaf topology to another network device within the spine and leaf topology. For example, traffic being transmitted from network device 5A to network device 4A to network device 3B may have a hop count of 2 (e.g., network device 5A to network device 4A is 1 hop and network device 4A to network device 3B is 1 hop). As another example, traffic being transmitted from network device 1C to network device 2E to network device 3B to network device 2A may have a hop count of 3 (e.g., network device 1C to network device 2E is 1 hop, network device 2E to network device 3B is 1 hop, and network device 3B to network device 2A is 1 hop).

Figure 1C:
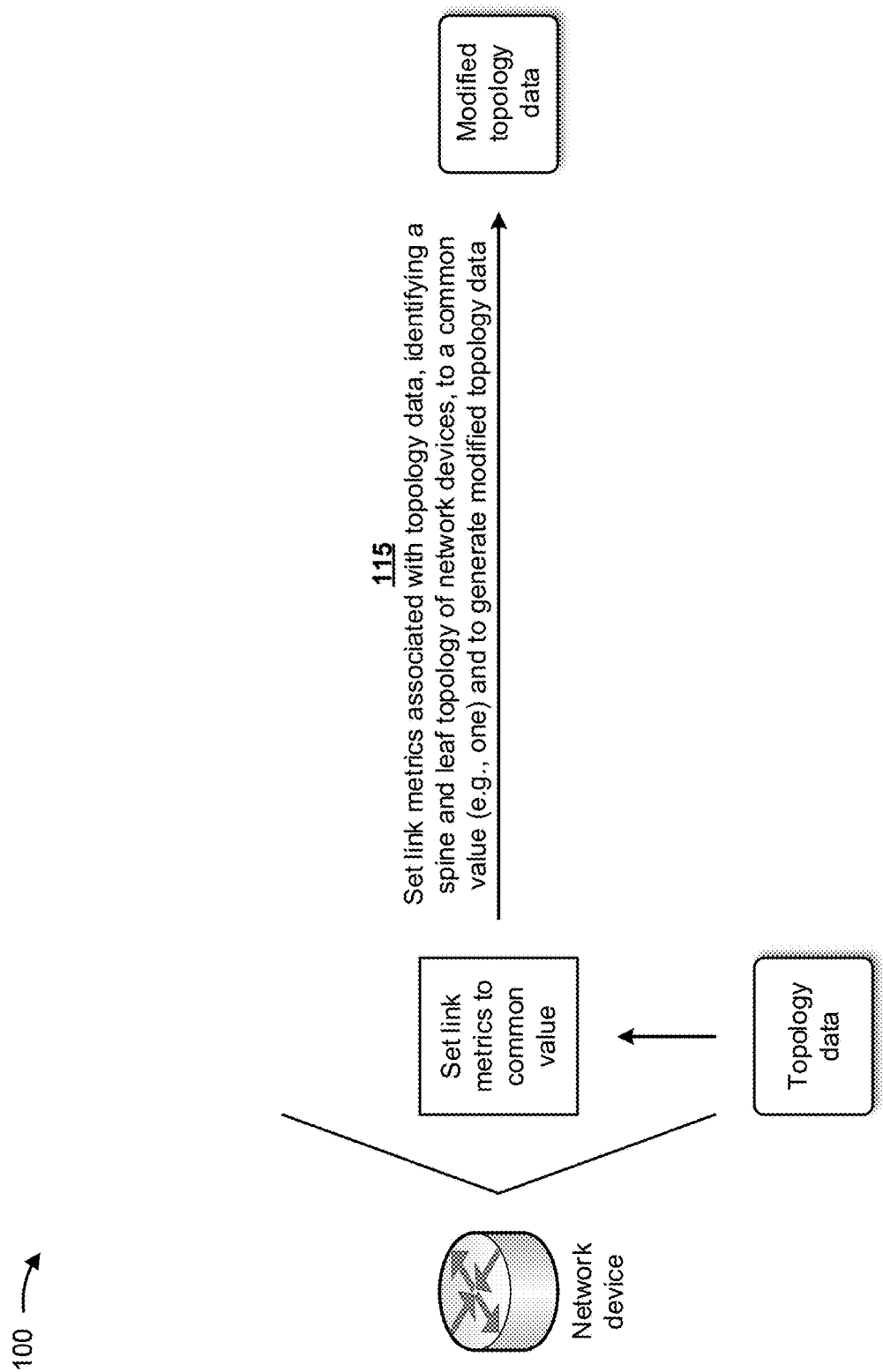

As shown in FIG. 1C, a network device included in the spine and leaf topology may receive topology data. The topology data may identify the spine and leaf topology of network devices, such as the spine and leaf topology shown in FIG. 1B. The topology data may be a map of the connectivity of the spine and leaf topology, showing which network devices are connected to which other network devices. The topology data may identify all physical connections between network devices in the spine and leaf topology. The topology data may identify which network devices are physically connected (e.g., links between network devices) and which network devices are not physically connected.

The topology data may include one or more destinations for traffic. The one or more destinations may be one or more network devices included in the spine and leaf topology and/or one or more devices located outside of the spine and leaf topology and reachable via a network device of the spine and leaf topology. In some implementations, the one or more destinations may be the leaf network devices in the spine and leaf topology. In some implementations, the destinations may be all other network devices in the spine and leaf topology. For example, if the network device is network device 5A, the destinations identified in the topology data may be every other network device (e.g., network devices 5B-5F, network devices 4A-4F, network device 3A-3F, etc.) other than network device 5A.

The topology data may identify link metrics. A link metric may identify a value (e.g., a cost) associated with traffic being transmitted from one network device of the spine and leaf topology to another network device physically connected to the network device of the spine and leaf topology. The link metrics may identify that the cost for each link between each network device is the same. Alternatively, the link metrics may identify that the cost for each link between each network device is different (e.g., some links between network devices may have a higher cost than other links between other network devices).

As shown by reference number 115, the network device may set link metrics associated with the topology data to a common value (e.g., one). The network device may set link metrics associated with the topology data to a value of one, such that the cost for traffic to reach any destination in the spine and leaf topology is the same as the hop count associated with the traffic though the spine and leaf topology. The network device may modify the topology data with the link metric set to the common value, resulting in a modified topology data. In this way, the link metrics associated with the topology data may be used to determine the number of network devices that traffic passes through in the spine and leaf topology to reach a destination associated with the traffic.

Figure 1D:
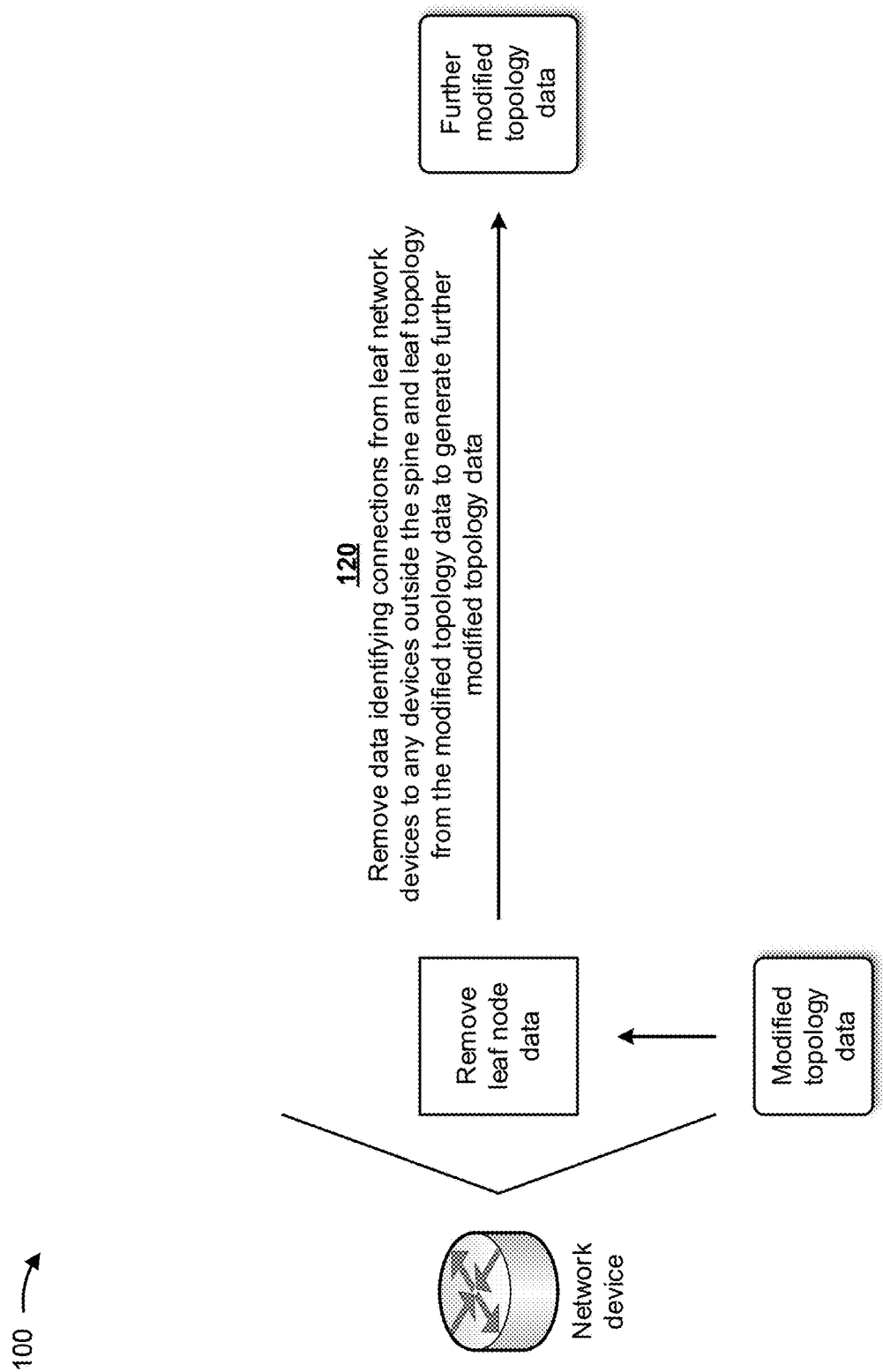

As shown in FIG. 1D, and by reference number 120, the network device may remove data identifying connections from leaf network devices to any devices (e.g., endpoint devices, server devices, cloud computing platforms, and/or the like) outside of the spine and leaf topology from the modified topology data to generate further modified topology data. The further modified topology data may only include data identifying connections between network devices within the spine and leaf topology. As connections to devices outside of the spine and leaf topology may or may not be physical connections, data identifying the connections to devices outside of the spine and leaf topology may be discarded.

In some implementations, the modified topology data may not include data identifying connections from leaf network devices to one or more devices outside of the spine and leaf topology. As such, the network device may not need to remove data identifying connections from leaf network devices to any devices outside of the spine and leaf topology. Therefore, in some implementations, the modified topology data may be equivalent to and used interchangeably with the further modified topology data.

As described above, the spine and leaf topology may include a defined system for the configuration of physical connections within the spine and leaf topology (e.g., each network device is physically connected to all the network devices in adjacent tiers, but network devices are not connected to other network devices in the same tier). As such, any connections outside of the spine and leaf topology can be ignored when determining if there are any miswirings within the spine and leaf topology because the connections to devices outside of the spine and leaf topology may not follow the same defined system for the configuration of physical connections, as described above. As the leaf network devices may be connected to devices outside of the spine and leaf topology, the connections to devices from the leaf network devices to any devices outside of the spine and leaf topology may be removed from the modified topology data such that only the paths within the spine and leaf topology are calculated, as described below. This may conserve computing resources and/or network resources that would have otherwise been used performing calculations of paths for traffic to devices outside of the spine and leaf topology.

Figure 1E:
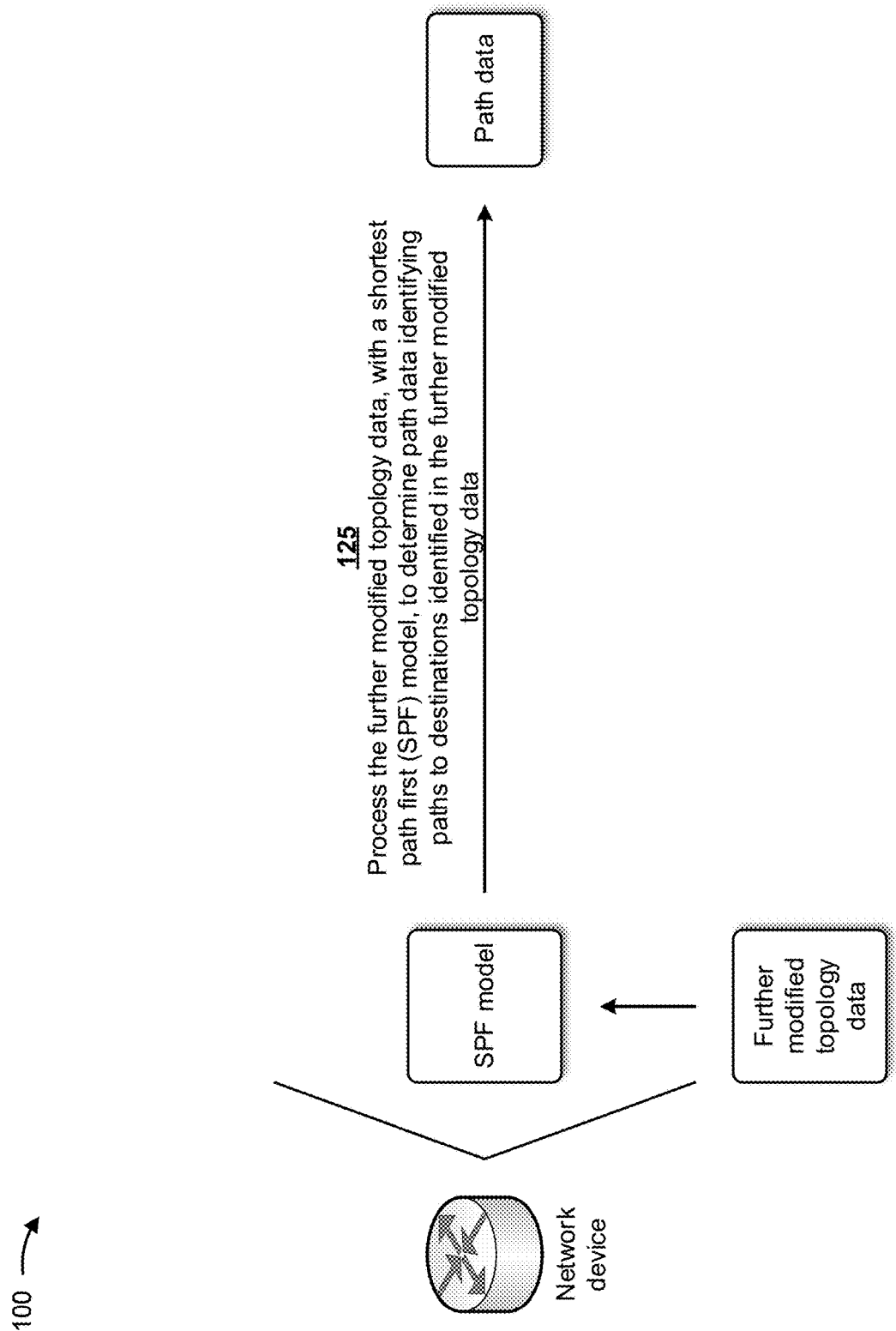

As shown in FIG. 1E, the network device may utilize a shortest path first (SPF) model to calculate loop free paths through the spine and leaf topology. The SPF model may include an algorithm used by the network device to calculate the shortest path between the network device and a given destination in the spine and leaf topology.

The SPF model may include a Dijkstra Shortest Path First algorithm. In some implementations, an algorithm other than the Dijkstra Shortest Path First algorithm may be used by the SPF model. The SPF algorithm may determine the shortest path between two network devices. The SPF algorithm may determine the shortest paths from the network device to all other network devices in the spine and leaf topology. The SPF algorithm may compare a cost of two paths from the network device to the same destination to determine the shortest path to the destination. For example, the SPF algorithm may compare the cost, based on the link metrics, associated with each path to determine the shortest path to the destination.

The SPF algorithm may be modified, as described below, to detect a miswiring within the spine and leaf topology based on comparing the cost associated with each path to the destination.

As shown by reference number 125, the network device may process the further modified topology data, with the SPF model, to determine path data identifying paths to destinations (e.g., paths to all other network devices in the spine and leaf topology) identified in the further modified topology data. In some implementations, the network device may process the further modified topology data, with the SPF model, to determine path data identifying paths to destinations where, in this case, the destinations are less than all other network devices in the spine and leaf topology. A path may identify one or more network devices that traffic will pass through to reach a destination. For example, if the network device is network device 5A and the destination is network device 2D, a path may identify that traffic will travel from network device 5A to network device 4B to network device 3C to network device 2D. In some implementations, the path data may indicate only the cost, based on the link metrics, associated with each path.

The path data may include a plurality of possible paths to reach a plurality of destinations. In some implementations, the path data may identify each possible path to reach each destination identified in the further modified topology data. For example, the path data may identify each possible path that traffic may follow to reach all other network devices within the spine and leaf topology from the network device.

Figure 1F:
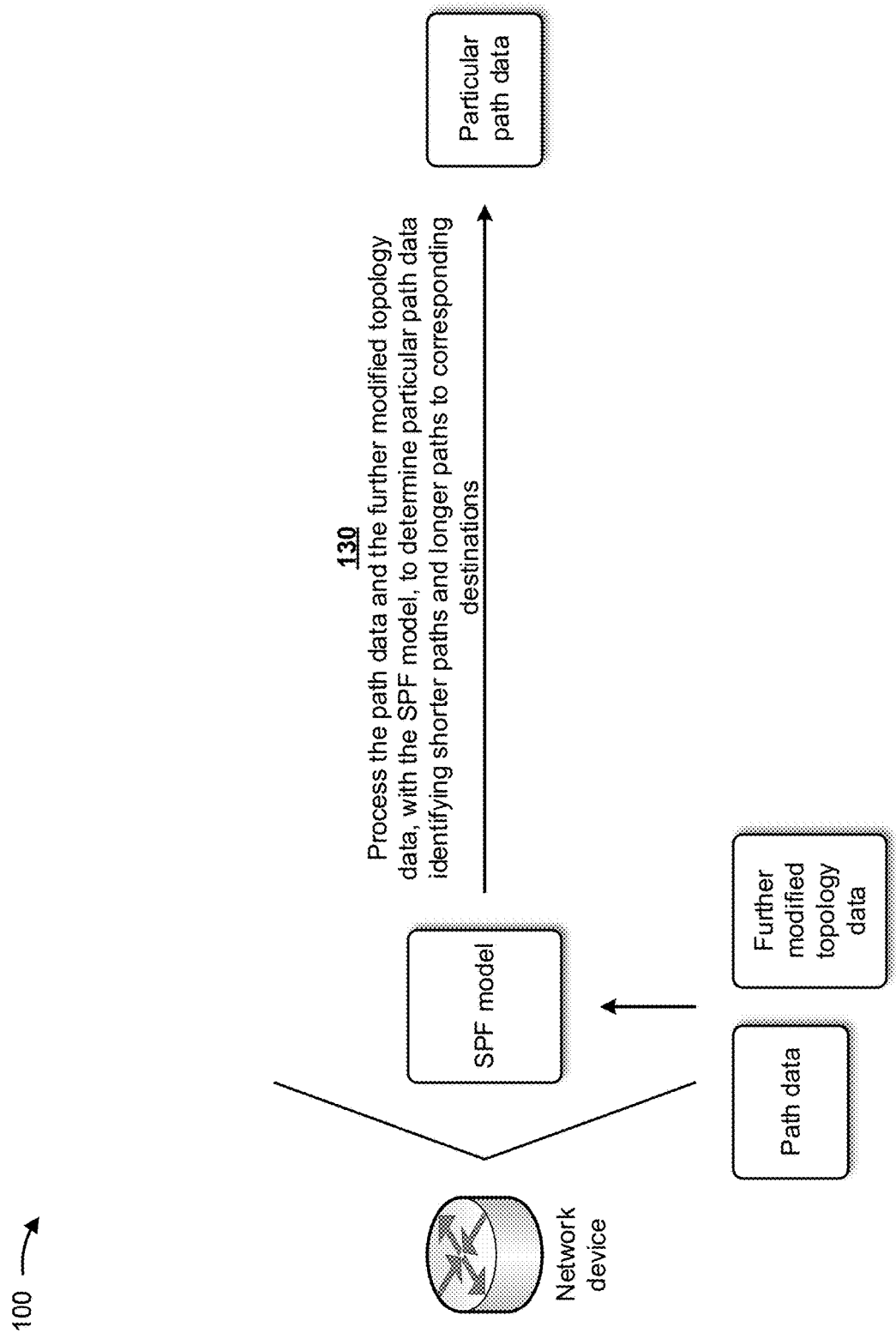

As shown in FIG. 1F, the network device may input the path data and the further modified topology data into the SPF model. As shown by reference number 130, the SPF model may process the path data and the further modified topology data to determine particular path data. The particular path data may identify shorter paths and longer paths to corresponding destinations from the network device. The network device may identify shorter paths and longer paths associated with each destination identified in the further modified topology data (e.g., the network device may identify shorter paths and longer paths to reach every other network device in the spine and leaf topology). The network device may identify shorter paths and longer paths, using the SPF model, based on the cost associated with each path (e.g., shorter paths may have a lower cost than longer paths).

For example, assume that the network device is network device 5A and the destination is network device 2B. Network device 5A may identify a first path (e.g., from network device 5A to network device 4A to network device 3A to network device 2B) having a cost of 3. Network device 5A may identify a second path (e.g., from network device 5A to network device 4A to network device 3B to network device 4C to network device 3D to network device 2B) having a cost of 5. Network device 5A may identify, based on the SPF model, that the first path is a shorter path and the second path is a longer path based on the cost associated with the first path being less than the cost associated with the second path. The first path and the second path from network device 5A to network device 2B are provided merely as examples. In practice, network device 5A may identify each possible path from the network device 5A to network device 2B and the costs associated with each possible path to identify a plurality of shorter paths and longer paths to reach the destination of network device 2B.

Figure 1G:
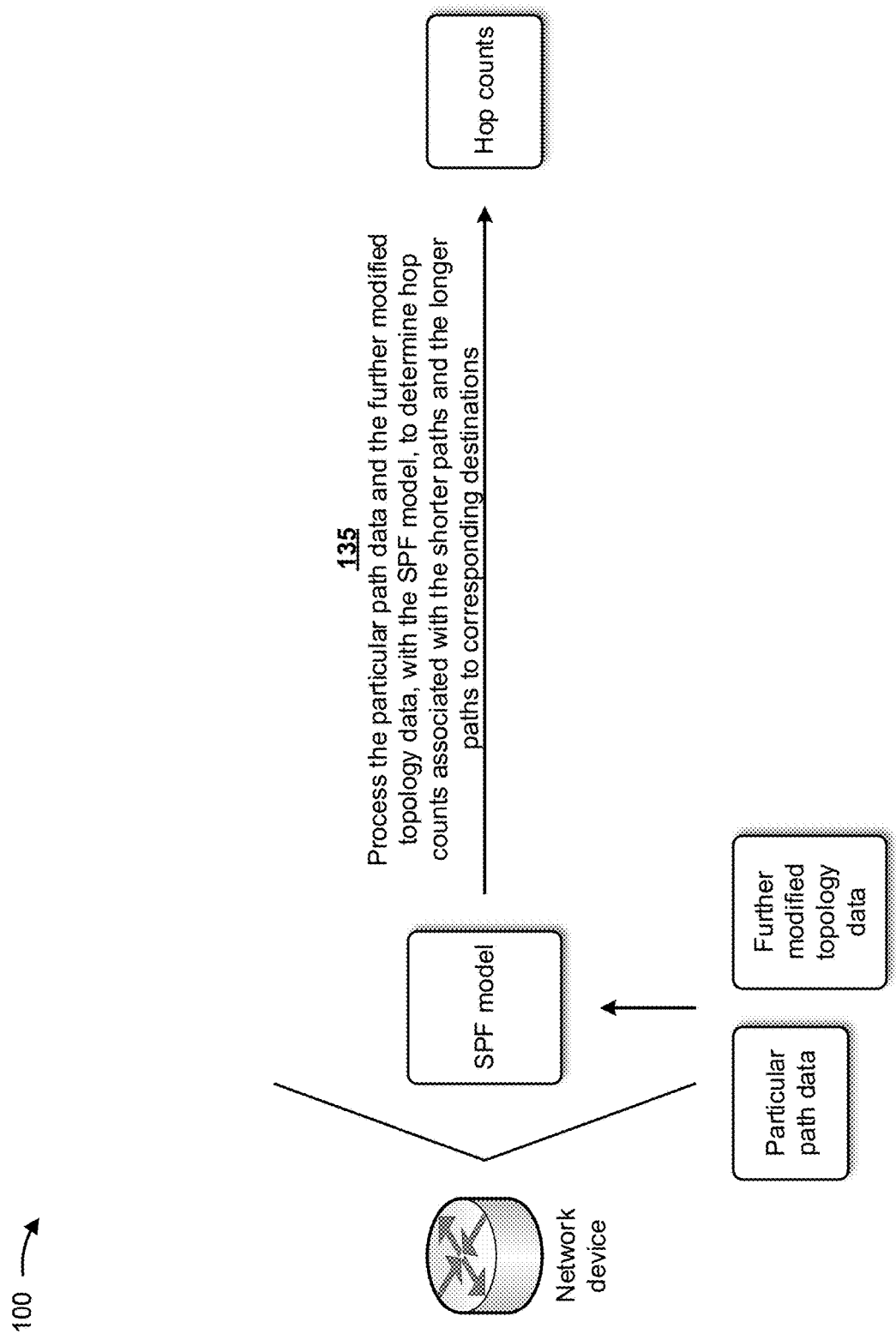

As shown in FIG. 1G, and by reference number 135, the network device may process, using the SPF model, the particular path data and the further modified topology data to determine hop counts associated with the shorter paths and the longer paths to corresponding destinations. The network device may determine, using the SPF model, the hop count associated with each path identified in the particular path data. The network device may determine the hop count associated with a path based on the cost associated with the path.

As the link metrics in the further modified topology data have been set to a common value, as described above, the cost associated with a path may correspond to the hop count associated with the path. For example, if the common value of the link metrics is 1, each transition in a path from one network device to another network device increases a cost associated with the path by 1. As described above, moving from one network device to another network device is associated with 1 hop. As such, the hop count associated with a path may be determined based on the cost associated with the path (e.g., if a cost associated with a path is 5, the network device may determine that the hop count associated with the path is 5).

In some implementations, the common value of the link metrics may be a value other than 1. The hop count associated with a path may be determined by dividing the cost of the path by the common value. For example, the common value of the link metrics may be 5 and the cost of a path may be 20. The network device may determine that the hop count associated with the path is 4 (e.g., 20 divided by 5).

Figure 1H:
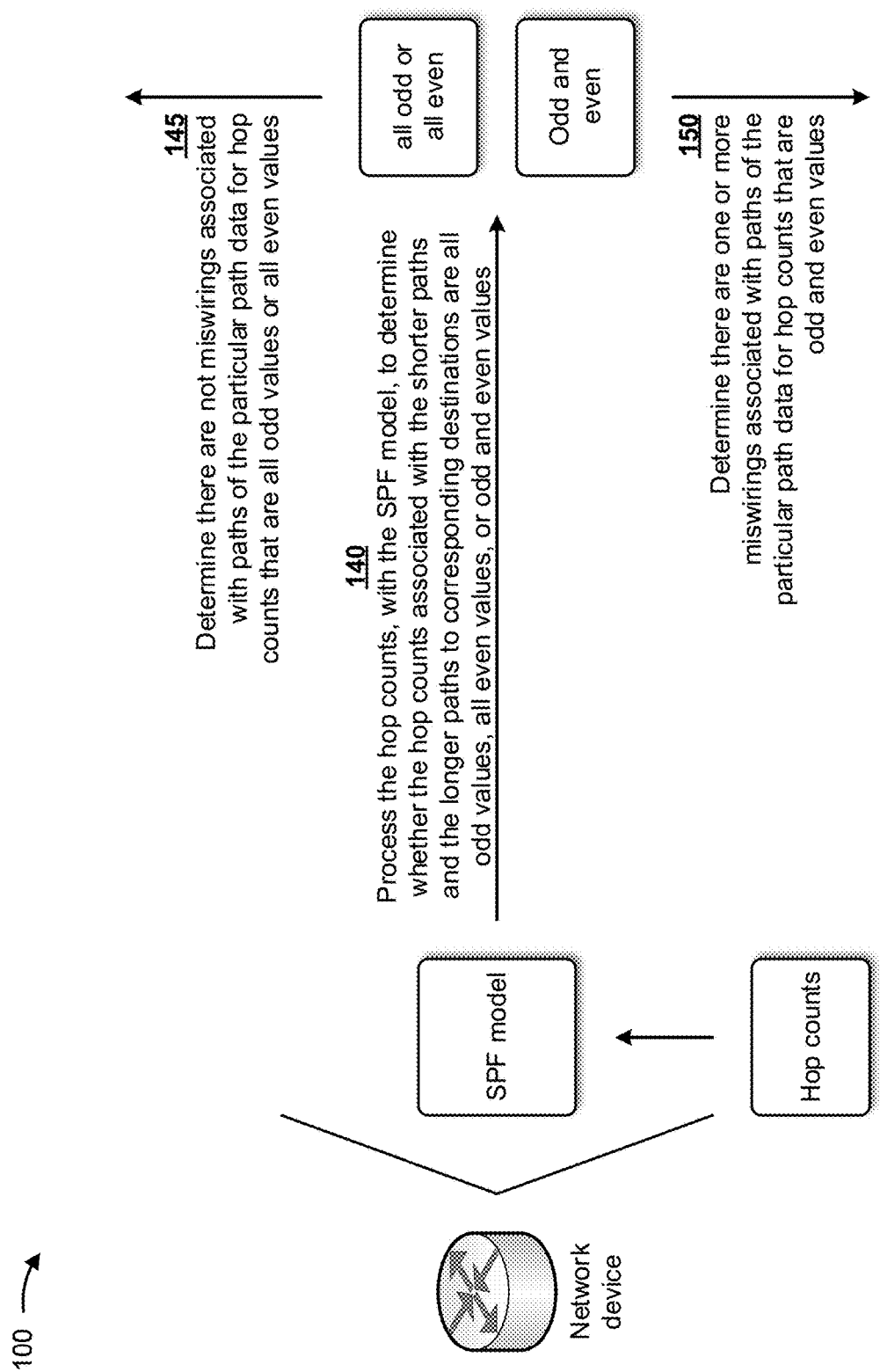

As shown in FIG. 1H, and by reference number 140, the network device may process the hop counts, using the SPF model, to determine whether the hop counts associated with the shorter paths and the longer paths corresponding to destinations are all odd values, all even values, or a combination of odd and even values. The network device may determine whether the hop counts associated with each path from the network device to a destination are all odd values, all even values, or a combination of even and odd values.

As described above, the physical connections within the spine and leaf topology are configured following a defined system. As such, the hop count to reach a destination from the network device should always be an odd value or should always be an even value, regardless of the path taken to reach the destination, if the physical connections within the spine and leaf topology are configured correctly.

If hop counts associated with paths to reach the same destination from the network device have a combination of odd and even values, the physical connections within the spine and leaf topology are configured incorrectly (e.g., there is at least one miswiring). A miswiring may be a physical connection that does not follow the defined system described above. For example, a miswiring may be a physical connection between two network devices in the same tier (e.g., a physical connection between network device 5A and network device 5B). As another example, a miswiring may be a physical connection between two network devices that are not in adjacent tiers (e.g., a physical connection between network device 5A and network device 3A).

The network device may compare the hop counts of different paths to reach each destination (e.g., paths to reach all (or less than all) other network devices in the spine and leaf topology). For example, the network device, using the SPF model, may compare the hop counts of each possible path to reach a particular destination to determine if the hop counts are all odd values, all even values, or are a combination of odd and even values.

For this example, assume that the network device is network device 5A and the destination is network device 2B. Each path from network device 5A to network device 2B should be associated with an odd value hop count if there are no miswirings in the spine and leaf topology. For example, a path from network device 5A to network device 4A to network device 3A to network device 2B has a hop count of 3. A path from network device 5A to network device 4B to network device 3C to network device 2C to network device 1C to network device 2B has a hop count of 5. However, assume that there is a miswiring between network device 2A and network device 2B (e.g., a physical connection between network device 2A and network device 2B). A path from network device 5A to network device 4A to network device 3A to network device 2A to network device 2B has a hop count of 4. The even hop count associated with the path from network device 5A to network device 2B indicates a miswiring.

As further shown in FIG. 1H, and by reference number 145, the network device may determine there are no miswirings associated with paths of the particular path data for hop counts that are all odd values or all even values. For example, if the particular path data identifies a shorter path associated with 3 hop counts and a longer path associated with 5 hop counts, the network device may determine that there are no miswirings associated with the paths as both hop counts are odd values. Similarly, if the particular path data identifies a shorter path associated with 2 hop counts and a longer path associated with 6 hop counts, the network device may determine that there are no miswirings associated with the paths as both hop counts are even values.

As further shown in FIG. 1H, and by reference number 150, the network device may determine there is at least one miswiring associated with paths of the particular path data for hop counts that are a combination of odd and even values. For example, if the particular path data identifies a shorter path associated with 3 hop counts and a longer path associated with 6 hop counts, the network device may determine that there is a miswiring associated with the paths as the shorter path hop count is an odd value and the longer path hop count is an even value. Similarly, if the particular path data identifies a shorter path associated with 2 hop counts and a longer path associated with 5 hop counts, the network device may determine that there is a miswiring associated with the paths as the shorter path hop count is an even value and the longer path hop count is an odd value.

Figure 1J:
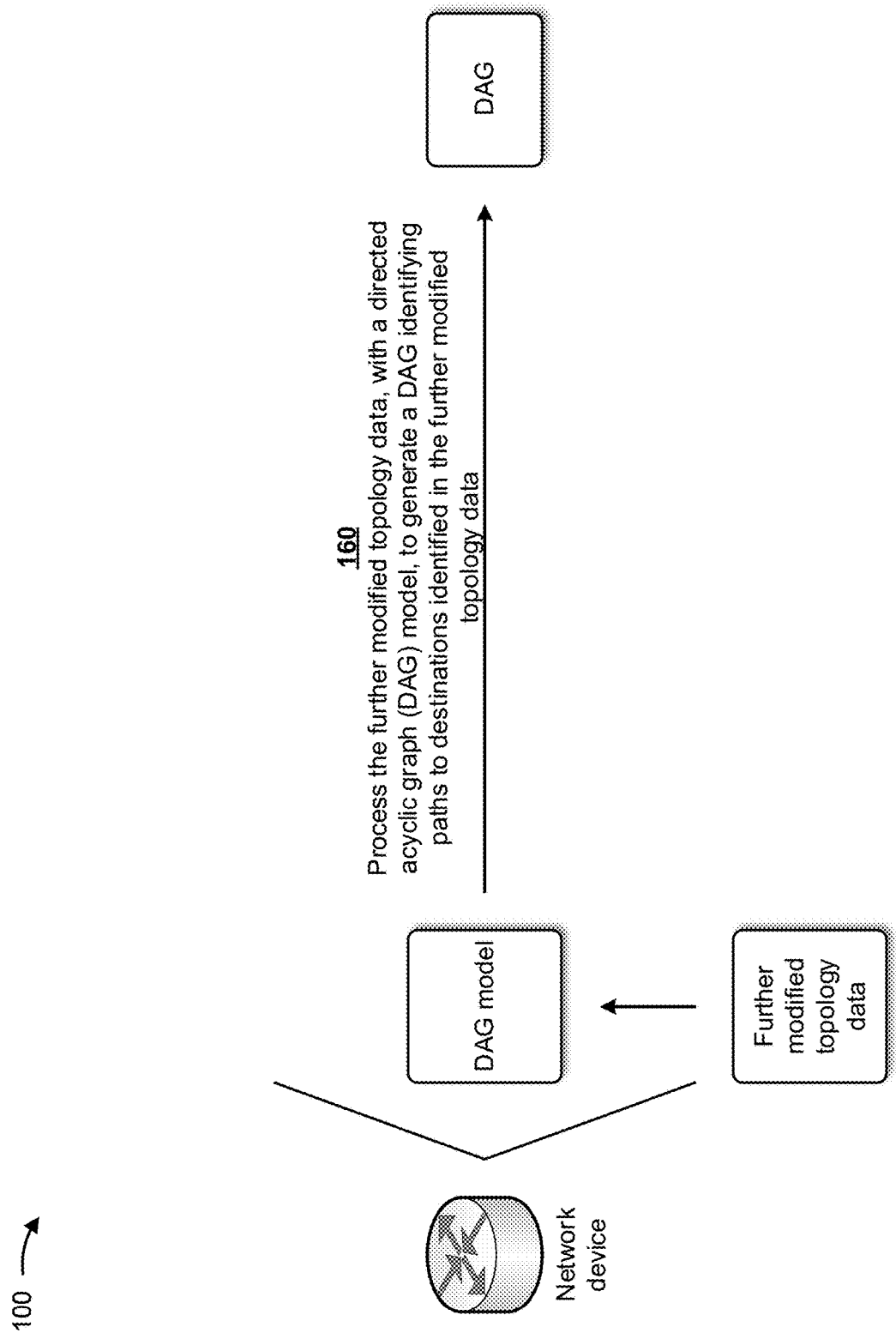
Figure 1K:
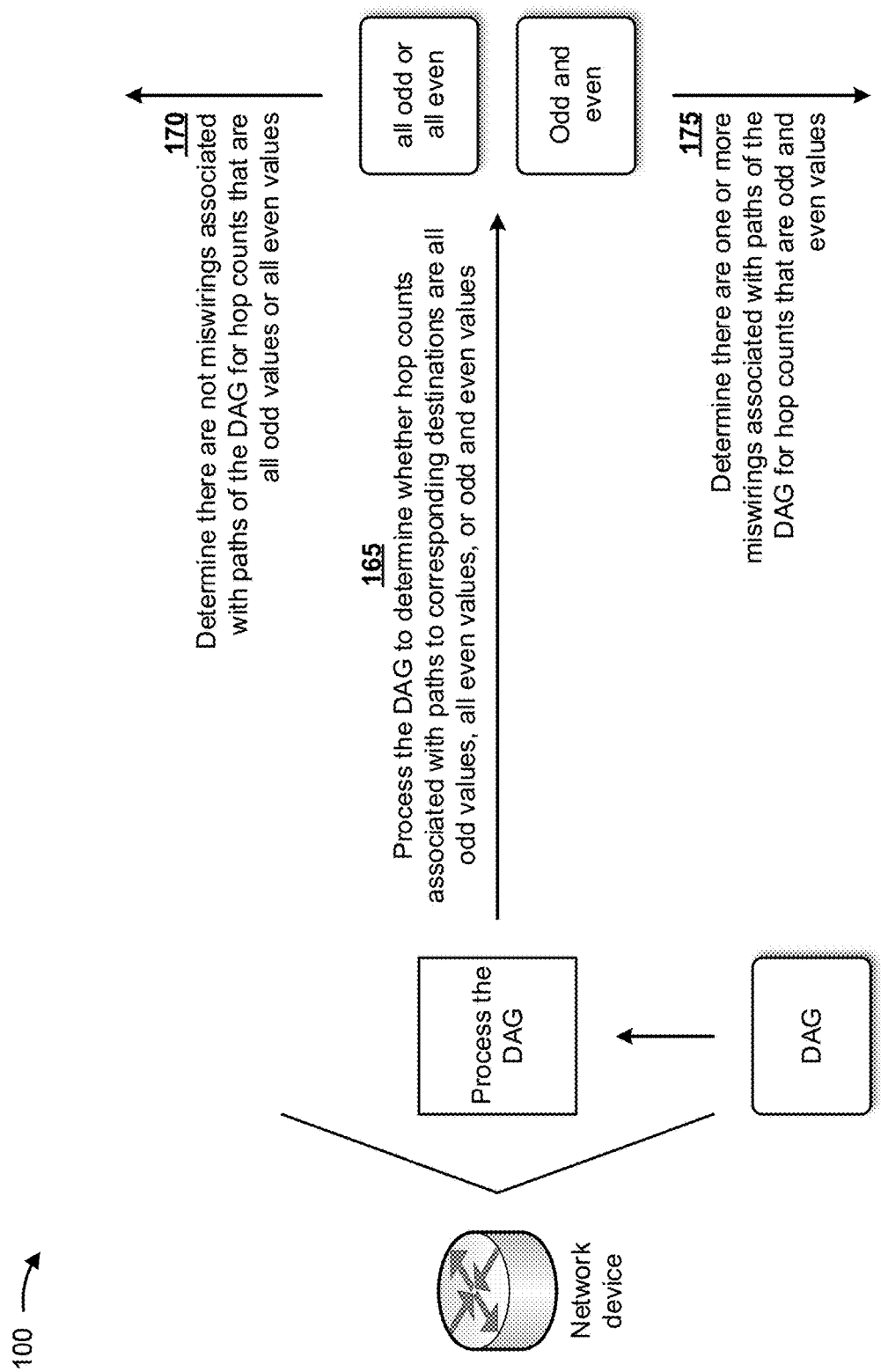

FIGS. 1I-1K provide an example of another technique for determining whether the spine and leaf topology has at least one miswiring. The example technique of FIGS. 1I-1K may be used instead of the example technique described in connection with FIGS. 1F-1H. Alternatively, the example technique of FIGS. 1I-1K may be used in combination with the example technique described in connection with FIGS. 1F-1H (e.g., both example techniques may be performed concurrently, one example technique may be performed before the other example technique, the result of one example technique may be used as an input to the other example, technique, and/or the like).

As shown in FIG. 1I, and by reference number 155, the network device may process the particular path data and the further modified topology data, using the SPF model, to discard the longer paths to corresponding destinations. The network device may generate shortest path topology data identifying the shorter paths to corresponding destinations in the spine and leaf topology.

The shortest path topology data may be a list that identifies the shortest path from the network device to every other network device in the spine and leaf topology. The network device may store a set of the shorter paths in the shortest path topology data (e.g., a particular number of the shorter paths, all shorter paths with costs that satisfy a threshold, and/or the like). For example, the network device may identify, using the SPF model, a path from the network device to a destination. The network device may compare the path to a shortest path associated with the destination stored in the shortest path topology data to determine if the path is shorter than the shortest path stored in the shortest path topology data, as described above (e.g., by comparing the cost and/or hop count associated with each path). If the path is shorter than the shortest path, the network device may replace the shortest path stored in the shortest path topology data with the path (after comparing the hop counts to determine if both hop counts are odd values, both even values, or one odd value and one even value, as described above). The previously shortest path, that was stored in the shortest path topology data, may be discarded. If the path is longer than the shortest path, the network device may discard the path, after comparing the hop counts.

In some implementations, the network device may not discard the longer paths. The network device may store the longer paths in a data structure, such as a list. The longer paths may be accessed by the network device. The network device may compare the hop counts of a path to a destination identified by the network device to the hop counts of the longer paths associated with the destination stored by the network device to determine if there is a miswiring associated with the path.

As described above, the SPF algorithm may be configured such that the network device, using the SPF algorithm, may determine if there are miswirings within the spine and leaf topology. An example of pseudocode associated with the SPF algorithm is shown below. In the pseudocode, the metric may be a hop count associated with a path. The pseudocode includes three variables. TENT is a list of potentially shortest paths, TOPO is the further modified topology data, and PATH is the shortest path topology data:

```
01 move "me" to the TENT from TOPO
02 while TENT is not empty {
03 sort TENT
04 selected=first node on TENT
05 if selected is in PATH {
06 compare metric of existing entry to selected
07 if both are odd OR both are even {
08 *do nothing*
09 } else {
```

```
10 flag miswiring
11 }
12 else {
13 add selected to PATH
10 for each node connected to selected in TOPO
11 if node is in TENT{
12 compare metric of existing entry to selected
13 if both are odd OR both are even {
14 *do nothing*
15 } else {
16 flag miswiring
17 {
18 else {
19 move node to TENT
20 }
21 γ
22 }
23 }
```

As shown in FIG. 1J, the network device may utilize a directed acyclic graph (DAG) model. The DAG model may be used as an alternative to the SPF model or the DAG model may be used in combination with the SPF model. The DAG model may be used to create a DAG associated with the spine and leaf topology. The further modified topology data may be input to the DAG model to create the DAG associated with the spine and leaf topology.

A DAG may be a data structure that includes one or more nodes and one or more directed edges. A node may represent an object (such as a network device) or data. A directed edge may represent a relationship between two nodes. For example, a DAG associated with the spine and leaf topology may include nodes to represent each network device in the spine and leaf topology and directed edges to represent each physical connection in the spine and leaf topology.

As further shown in FIG. 1J, and by reference number 160, the network device may process the further modified topology data, using the DAG model, to generate a DAG identifying paths to destinations identified in the further modified topology data. The further modified topology data may be the same further modified topology data as described above with respect to the SPF model.

The DAG may include all other network devices in the spine and leaf topology, represented by nodes. The nodes may include a node identifier that identifies that network device the node represents. The DAG may identify a path to a destination that includes connections between two or more nodes in the DAG by one or more directed edges in the DAG. For example, the DAG may identify paths to all other network devices in the spine and leaf topology from the network device.

As shown in FIG. 1K, and by reference number 165, the network device may process the DAG to determine whether hop counts associated with paths to corresponding destinations are all odd values, all even values, or a combination of odd and even values. The network device may store the information identified in the DAG in a data structure, such as a list, a table, and/or the like. The data structure may include the nodes and the connections between nodes. As such, the data structure may identify all paths to reach all other nodes. The data structure may identify each node using the node identifier associated with each node. The network device may sort the data structure by node identifier. The resulting data structure may identify all possible paths (or less than all possible paths), sorted by node identifier, that have been identified in the DAG associated with the spine and leaf topology.

As the link metric identified in the further modified topology data may be set to a common value (e.g., 1), the network device may determine a hop count associated with each path identified in the DAG, based on the cost associated with each path. The hop count associated with each path may be identified in the data structure.

As described above, if any node is reachable by both an even and an odd hop count, there is a miswiring of the physical connections in the spine and leaf topology. The network device may analyze the data structure to compare the hop counts associated with paths to reach a destination.

For example, as the data structure may be sorted by node identifier, paths associated with reaching the same destination may be located near each other in the data structure. The data structure may identify a hop count associated with each path. The network device may compare the hop counts of different paths to reach the same destination to determine if the hop counts associated with the paths to reach the same destination are all even values, all odd values, or a combination of even and odd values.

For example, if the network device is network device 5A, the data structure associated with the DAG may identify all the paths from network device 5A to all other network devices in the spine and leaf topology. The data structure may be sorted by node identifier. For example, the data structure may be sorted such that all paths from network device 5A to network device 2B identified by the DAG may be sorted together. In this way, the network device may conserve computing resources and/or network resources that would have otherwise been used to locate all paths from the network device to another network device in the spine and leaf topology.

As further shown in FIG. 1K, and by reference number 170, if the network device determines that the hop counts associated with the paths to reach corresponding destinations are all odd values or all even values, the network device may determine that there are no miswirings associated with the paths identified in the DAG. For example, the network device may analyze the data structure associated with the DAG and compare the hop counts associated with paths from the network device to a destination. If the hop counts are all odd values or are all even values, the network device may determine that there are no miswirings associated with the paths to the destination.

As shown by reference number 175, if the network device determines that the hop counts associated with the paths to reach corresponding destinations are a combination of odd and even values, the network device may determine that there are one or more miswirings associated with the paths identified in the DAG. For example, the network device may analyze the data structure associated with the DAG and compare the hop counts associated with paths from the network device to a destination. If the hop counts associated with the paths to the destination are a combination of odd and even values, the network device may determine that there is at least one miswiring associated with the paths to the destination.

Figure 1L:
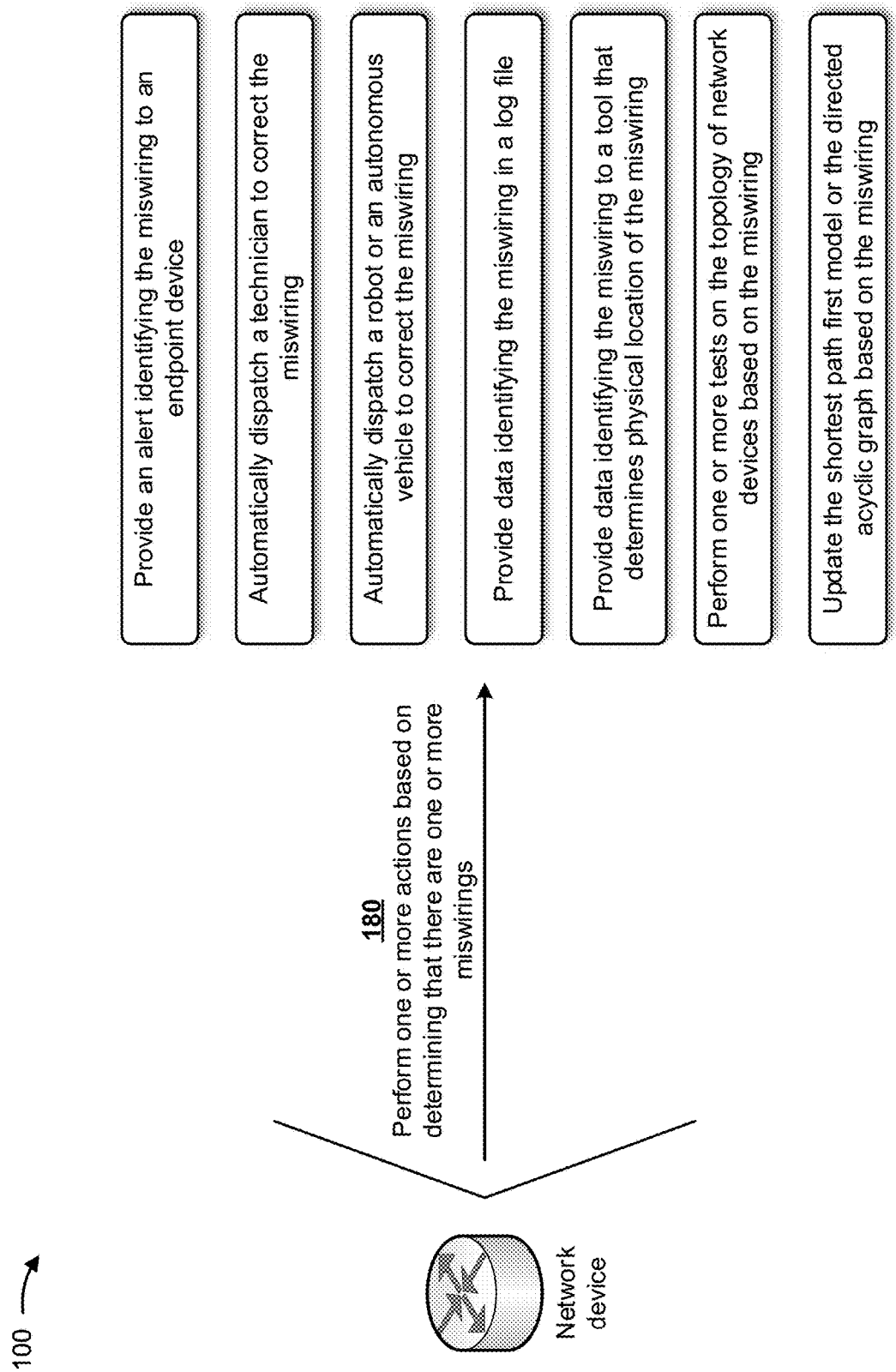

As shown in FIG. 1L, and by reference number 180, the network device may perform one or more actions based on determining that there is at least one miswiring in the spine and leaf topology. In some implementations, the one or more actions may include providing an alert identifying the miswiring to an endpoint device. The endpoint device may be a device associated with an operator of the network, a server device, and/or the like. For example, the network device may alert an endpoint device associated with an operator of the network such that the operator of the network may investigate, identify, and correct the miswiring. This may conserve computing resources and/or network resources that would have otherwise been used transmitting traffic over the network at a lower efficiency due to the miswiring.

In some implementations, the one or more actions may include automatically dispatching a technician to correct the miswiring. For example, the network device may identify a miswiring and schedule and/or dispatch the technician to correct the miswiring within the hardware of the spine and leaf topology. In this way, the network device may automatically cause performance of the action, thereby conserving resources that would otherwise have been used in arranging for the particular action to be performed, to procure personnel and/or other resources to perform the particular action, to schedule the particular action to be performed, and/or the like.

In some implementations, the one or more actions may include automatically dispatching a robot or an autonomous vehicle to correct the miswiring. For example, the network device may identify a miswiring and schedule and/or dispatch the robot or the autonomous vehicle to correct the miswiring within the hardware of the spine and leaf topology. In this way, the network device may automatically cause performance of the action, thereby conserving resources that would otherwise have been used in arranging for the particular action to be performed, to procure personnel and/or other resources to perform the particular action, to schedule the particular action to be performed, and/or the like.

In some implementations, the one or more actions may include providing data identifying the miswiring in a log file. The log file may be stored by the network device. For example, the network device may provide data to the log file each time the network device identifies a miswiring. In this way, the log file can be accessed and can be used for forensic purposes by the network device and/or a device associated with the network device in identifying one or more miswirings within the spine and leaf topology.

In some implementations, the one or more actions may include providing data identifying the miswiring to a tool that determines a physical locations of the miswiring. For example, the data identifying the miswiring may include an identifier identifying the network device, an identifier identifying the destination of the path that was associated with the miswiring, an identifier identifying the network devices associated with the miswiring (e.g., the two network devices that are improperly physically connected) by analyzing the path associated with the miswiring (based on the further modified topology data and the path associated with the miswiring) to determine the network devices associated with the miswiring, a time and date the network device determined there was a miswiring, and/or the like. In this way, the tool may analyze the data to identify the physical location of the miswiring. The tool may enable a technician, robot, or autonomous vehicle to quickly identify the physical location of the miswiring and correct the miswiring within the hardware of the spine and leaf topology. In this way, the network device may conserve computing and/or network resources that would have otherwise been used searching for the miswiring, analyzing the hardware associated with the spine and leaf topology to identify the miswiring, transmitting traffic over the spine and leaf topology while the miswiring is present (e.g., transmitting traffic via a less efficient spine and leaf topology), and/or the like In some implementations, the one or more actions may include performing one or more tests on the topology of network devices based on the miswiring. For example, the one or more tests on the topology of network devices may include a test to identify physical connections associated with the network device, a test to identify which other network devices the network device is physically connected to, a test to determine hop counts associated with one or more paths associated with the network device, and/or the like. In this way, the one or more tests on the topology of network devices based on the miswirings may identify which network device the miswiring is associated with. In this way, the network device may conserve computing and/or network resources that would have otherwise been used searching for the miswiring, analyzing the hardware associated with the spine and leaf topology to identify the miswiring, transmitting traffic over the spine and leaf topology while the miswiring is present (e.g., transmitting traffic via a less efficient spine and leaf topology), and/or the like.

In some implementations, the one or more actions may include updating the SPF model and/or the DAG model based on the miswiring. For example, the SPF model and/or the DAG model may be updated to remove paths from the further modified topology data associated with miswiring. In this way, the network devices of the spine and leaf topology may not transmit traffic using a path that is associated with a miswiring. In this way, the network device may conserve computing resources and/or network resources that would have otherwise been used transmitting traffic via a path that is associated with a miswiring.

While the functions described herein have been associated with a single network device of the spine and leaf topology, any network device within the spine and leaf topology may perform the same (or similar) functions. In some implementations, the functions described herein with respect to the network device may be performed by a device (e.g., a server device, a cloud computing platform, an endpoint device connected to a network device in the spine and leaf topology, and/or the like) that is external to the spine and leaf topology.

In this way, a network device may detect miswirings in a spine and leaf topology of network devices. This conserves computing resources (e.g., processing resources, memory resources, communication resources, and/or the like), networking resources, and/or the like that would otherwise have been wasted in experiencing degraded flooding performance, losing traffic in a network, attempting to recover the lost traffic, and/or the like. Furthermore, implementations described herein use a rigorous, computerized process to perform tasks that were not previously performed. For example, currently there does not exist a technique that detects miswirings in a spine and leaf topology of network devices, in the manner described herein.

As indicated above, FIGS. 1A-1L are provided merely as examples. Other examples may differ from what is described with regard to FIGS. 1A-1L. The number and arrangement of devices shown in FIGS. 1A-1L are provided as one or more examples. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) of FIGS. 1A-1L may perform one or more functions described as being performed by another set of devices of FIGS. 1A-1L.

Figure 2:
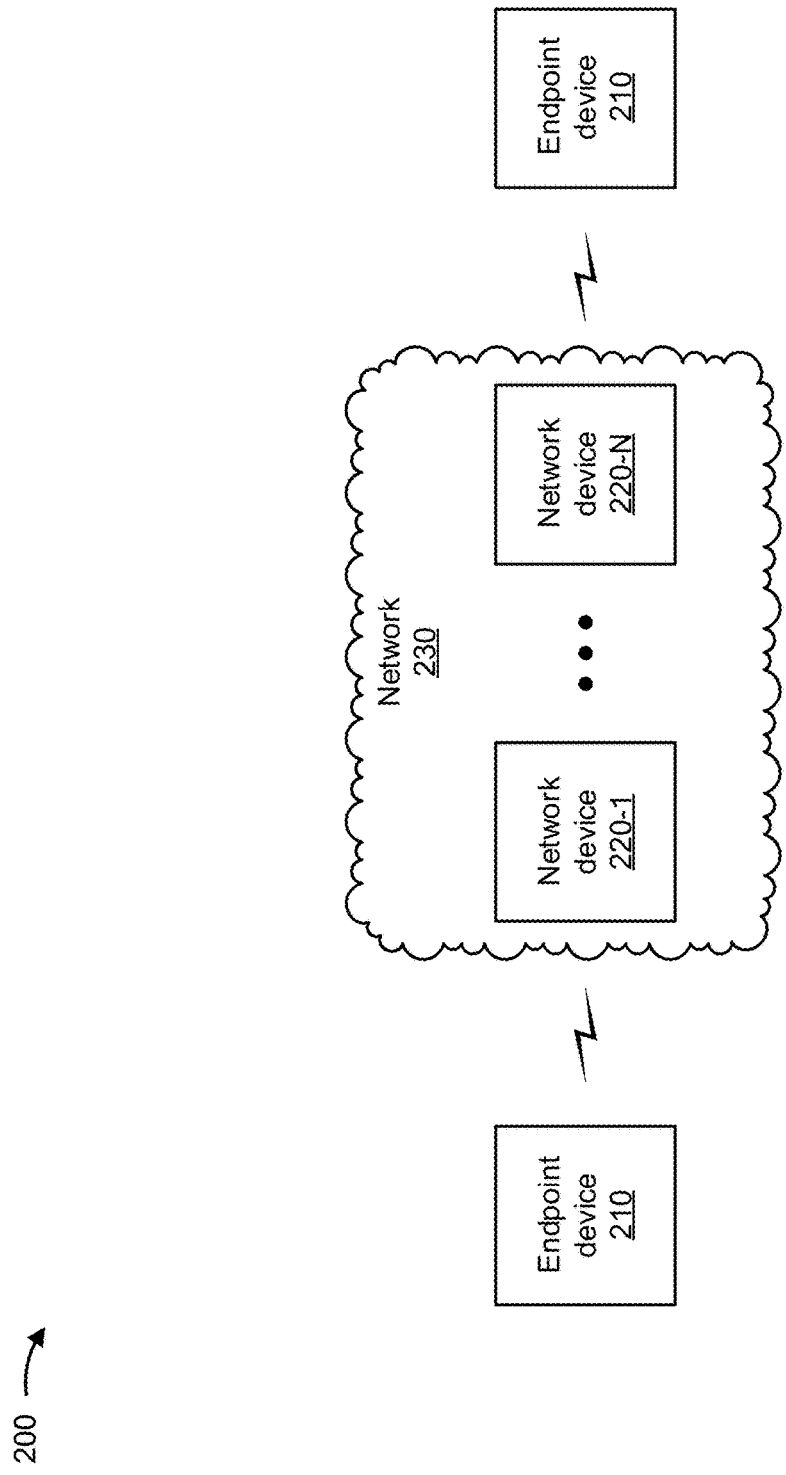
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. As described herein, network devices 220 may be connected in a spine and leaf topology.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
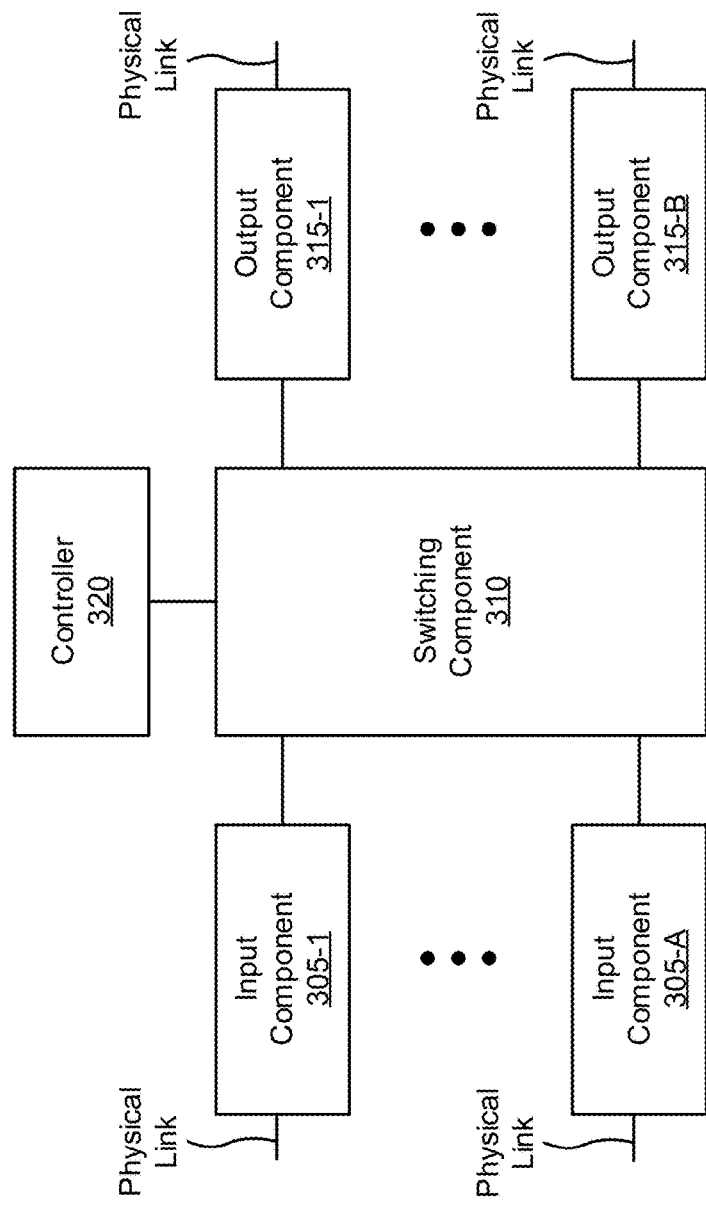
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
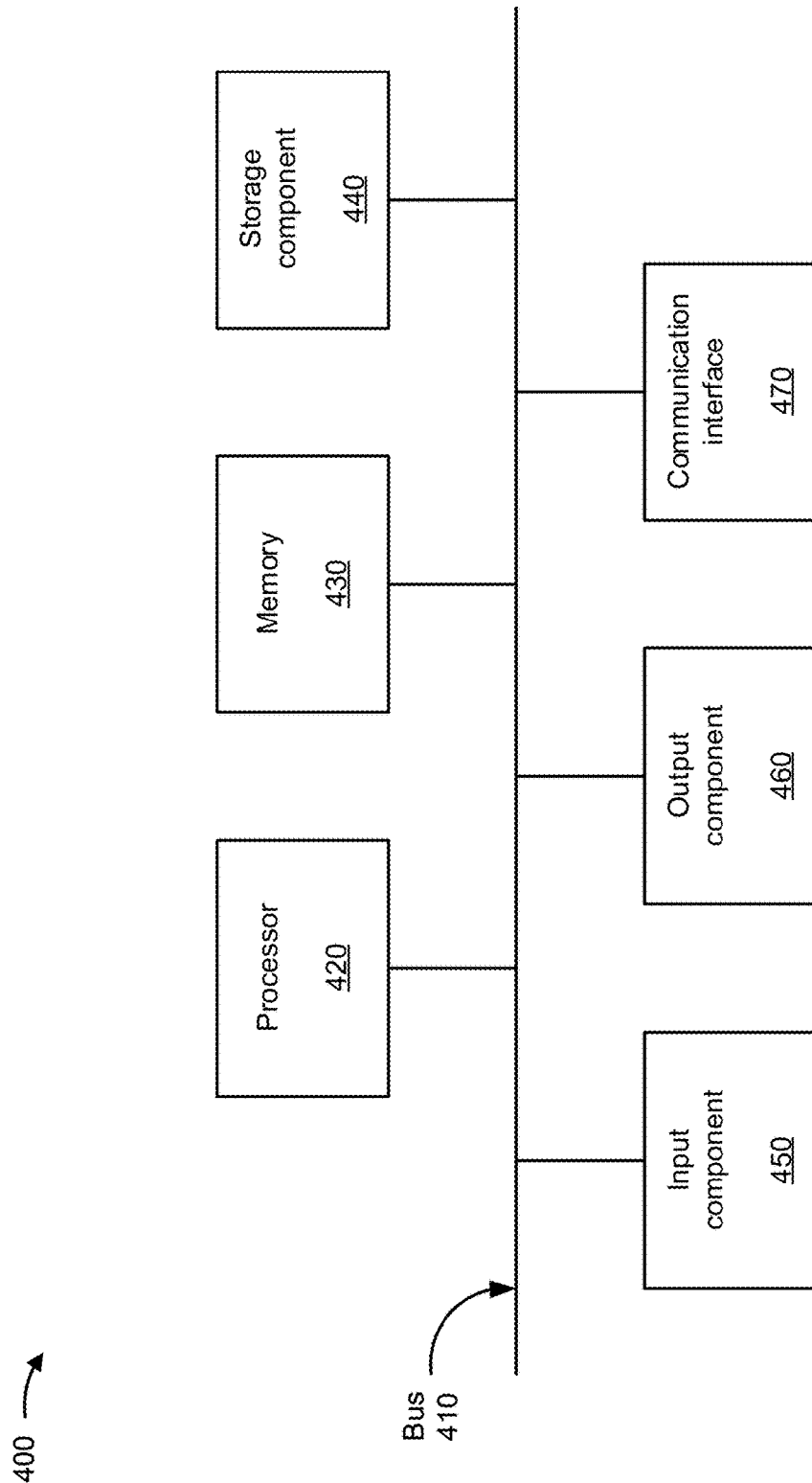

FIG. 4 is a diagram of example components of a device 400. Device 400 may correspond to endpoint device 210 and/or network device 220. In some implementations, endpoint device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
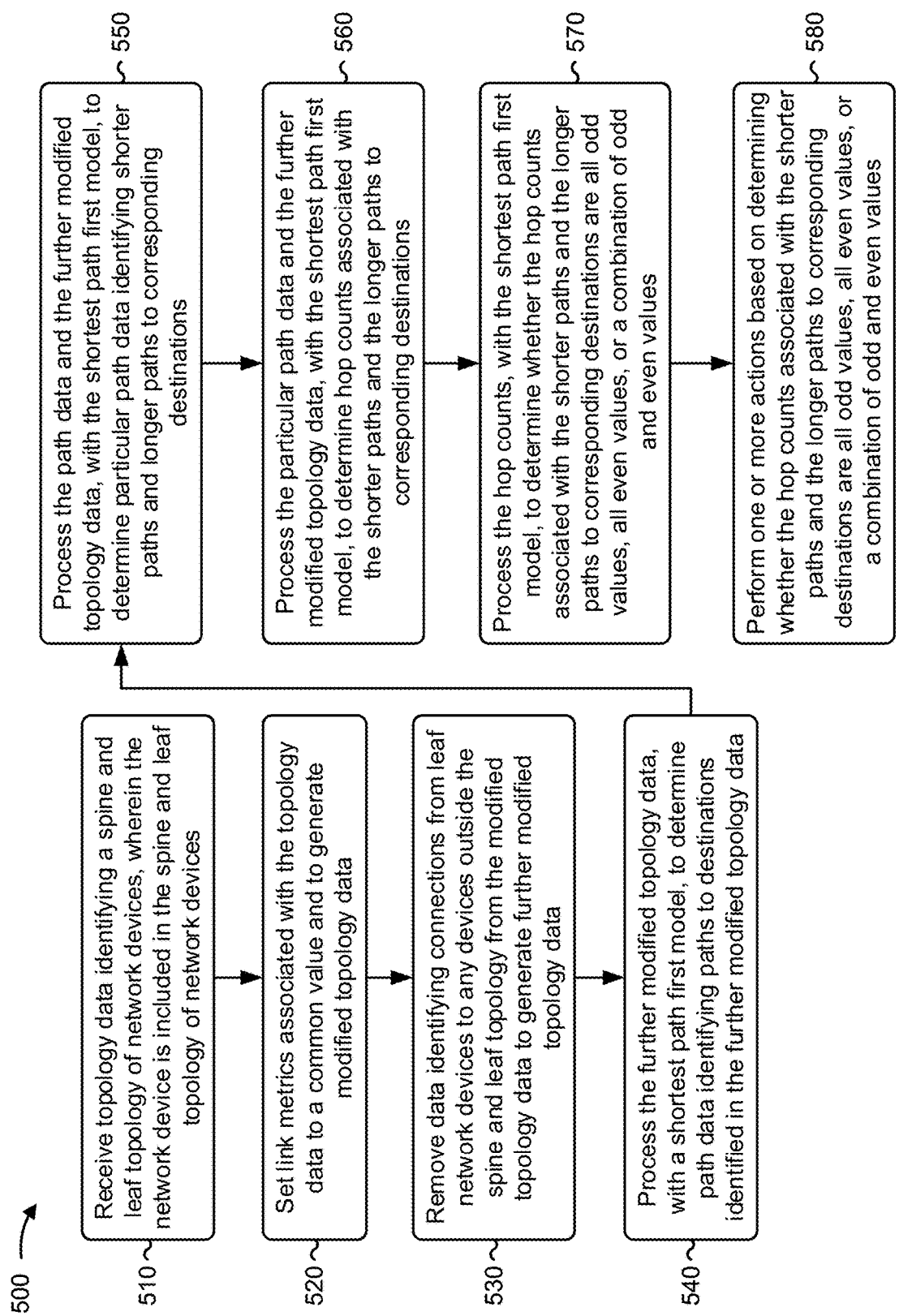

FIG. 5 is a flow chart of an example process 500 for detecting miswirings in a spine and leaf topology of network devices. In some implementations, one or more process blocks of FIG. 5 may be performed by a device (e.g., network device 220). In some implementations, one or more process blocks of FIG. 5 may be performed by another device or a group of devices separate from or including the device, such as an endpoint device (e.g., endpoint device 210).

As shown in FIG. 5, process 500 may include receiving topology data identifying a spine and leaf topology of network devices, wherein the network device is included in the spine and leaf topology of network devices (block 510). For example, the device (e.g., using input component 305, switching component 310, controller 320, processor 420, communication interface 470, and/or the like) may receive topology data identifying a spine and leaf topology of network devices, as described above. In some implementations, the network device is included in the spine and leaf topology of network devices.

As further shown in FIG. 5, process 500 may include setting link metrics associated with the topology data to a common value and to generate modified topology data (block 520). For example, the device (e.g., using switching component 310, controller 320, processor 420, memory 430, and/or the like) may set link metrics associated with the topology data to a common value and to generate modified topology data, as described above.

As further shown in FIG. 5, process 500 may include removing data identifying connections from leaf network devices to any devices outside the spine and leaf topology from the modified topology data to generate further modified topology data (block 530). For example, the device (e.g., switching component 310, controller 320, processor 420, storage component 440, and/or the like) may remove data identifying connections from leaf network devices to any devices outside the spine and leaf topology from the modified topology data to generate further modified topology data, as described above.

As further shown in FIG. 5, process 500 may include processing the further modified topology data, with a shortest path first model, to determine path data identifying paths to destinations identified in the further modified topology data (block 540). For example, the device (e.g., using switching component 310, controller 320, processor 420, memory 430, and/or the like) may process the further modified topology data, with a shortest path first model, to determine path data identifying paths to destinations identified in the further modified topology data, as described above.

As further shown in FIG. 5, process 500 may include processing the path data and the further modified topology data, with the shortest path first model, to determine particular path data identifying shorter paths and longer paths to corresponding destinations (block 550). For example, the device (e.g., using switching component 310, controller 320, processor 420, storage component 440, and/or the like) may process the path data and the further modified topology data, with the shortest path first model, to determine particular path data identifying shorter paths and longer paths to corresponding destinations, as described above.

As further shown in FIG. 5, process 500 may include processing the particular path data and the further modified topology data, with the shortest path first model, to determine hop counts associated with the shorter paths and the longer paths to corresponding destinations (block 560). For example, the device (e.g., using switching component 310, controller 320, processor 420, memory 430, and/or the like) may process the particular path data and the further modified topology data, with the shortest path first model, to determine hop counts associated with the shorter paths and the longer paths to corresponding destinations, as described above.

As further shown in FIG. 5, process 500 may include processing the hop counts, with the shortest path first model, to determine whether the hop counts associated with the shorter paths and the longer paths to corresponding destinations are all odd values, all even values, or a combination of odd and even values (block 570). For example, the device (e.g., using switching component 310, controller 320, processor 420, storage component 440, and/or the like) may process the hop counts, with the shortest path first model, to determine whether the hop counts associated with the shorter paths and the longer paths to corresponding destinations are all odd values, all even values, or a combination of odd and even values, as described above.

As further shown in FIG. 5, process 500 may include performing one or more actions based on determining whether the hop counts associated with the shorter paths and the longer paths to corresponding destinations are all odd values, all even values, or a combination of odd and even values (block 580). For example, the device (e.g., using switching component 310, output component 315, controller 320, processor 420, memory 430, storage component 440, communication interface 470, and/or the like) may perform one or more actions based on determining whether the hop counts associated with the shorter paths and the longer paths to corresponding destinations are all odd values, all even values, or a combination of odd and even values, as described above.

Process 500 may include additional implementations, such as any single implementation or any combination of implementations described below and/or in connection with one or more other processes described elsewhere herein.

In a first implementation, performing the one or more actions includes determining there are not miswirings in the spine and leaf topology of network devices when the hop counts associated with the shorter paths and the longer paths to corresponding destinations are determined to be all odd values or all even values.

In a second implementation, alone or in combination with the first implementation, performing the one or more actions includes determining there is at least one miswiring in the spine and leaf topology of network devices when the hop counts associated with the shorter paths and the longer paths to corresponding destinations are determined to be a combination of odd and even values.

In a third implementation, alone or in combination with one or more of the first and second implementations, performing the one or more actions includes providing an alert identifying a miswiring in the spine and leaf topology of network devices to an endpoint device when the miswiring is identified based on determining whether the hop counts associated with the shorter paths and the longer paths to corresponding destinations are all odd values, all even values, or a combination of odd and even values; automatically dispatching a technician to correct a miswiring in the spine and leaf topology of network devices when the miswiring is identified based on determining whether the hop counts associated with the shorter paths and the longer paths to corresponding destinations are all odd values, all even values, or a combination of odd and even values; or automatically dispatching a robot or an autonomous vehicle to correct a miswiring in the spine and leaf topology of network devices when the miswiring is identified based on determining whether the hop counts associated with the shorter paths and the longer paths to corresponding destinations are all odd values, all even values, or a combination of odd and even values.

In a fourth implementation, alone or in combination with one or more of the first through third implementations, performing the one or more actions includes providing data identifying a miswiring in the spine and leaf topology of network devices in a log file when the miswiring is identified based on determining whether the hop counts associated with the shorter paths and the longer paths to corresponding destinations are all odd values, all even values, or a combination of odd and even values; providing data identifying a miswiring in the spine and leaf topology of network devices to a tool that determines physical locations of the miswiring when the miswiring is identified based on determining whether the hop counts associated with the shorter paths and the longer paths to corresponding destinations are all odd values, all even values, or a combination of odd and even values; or performing one or more tests on the spine and leaf topology based on a miswiring in the spine and leaf topology of network devices when the miswiring is identified based on determining whether the hop counts associated with the shorter paths and the longer paths to corresponding destinations are all odd values, all even values, or a combination of odd and even values.

In a fifth implementation, alone or in combination with one or more of the first through fourth implementations, process 500 includes processing the particular path data and the further modified topology data, with the shortest path first model, to discard the longer paths to corresponding destinations and to generate shortest path topology data identifying the shorter paths to corresponding destinations in the spine and leaf topology.

In a sixth implementation, alone or in combination with one or more of the first through fifth implementations, a stage of network devices of the spine and leaf topology is connected to a next stage of network devices and network devices of the stage are not interconnected.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
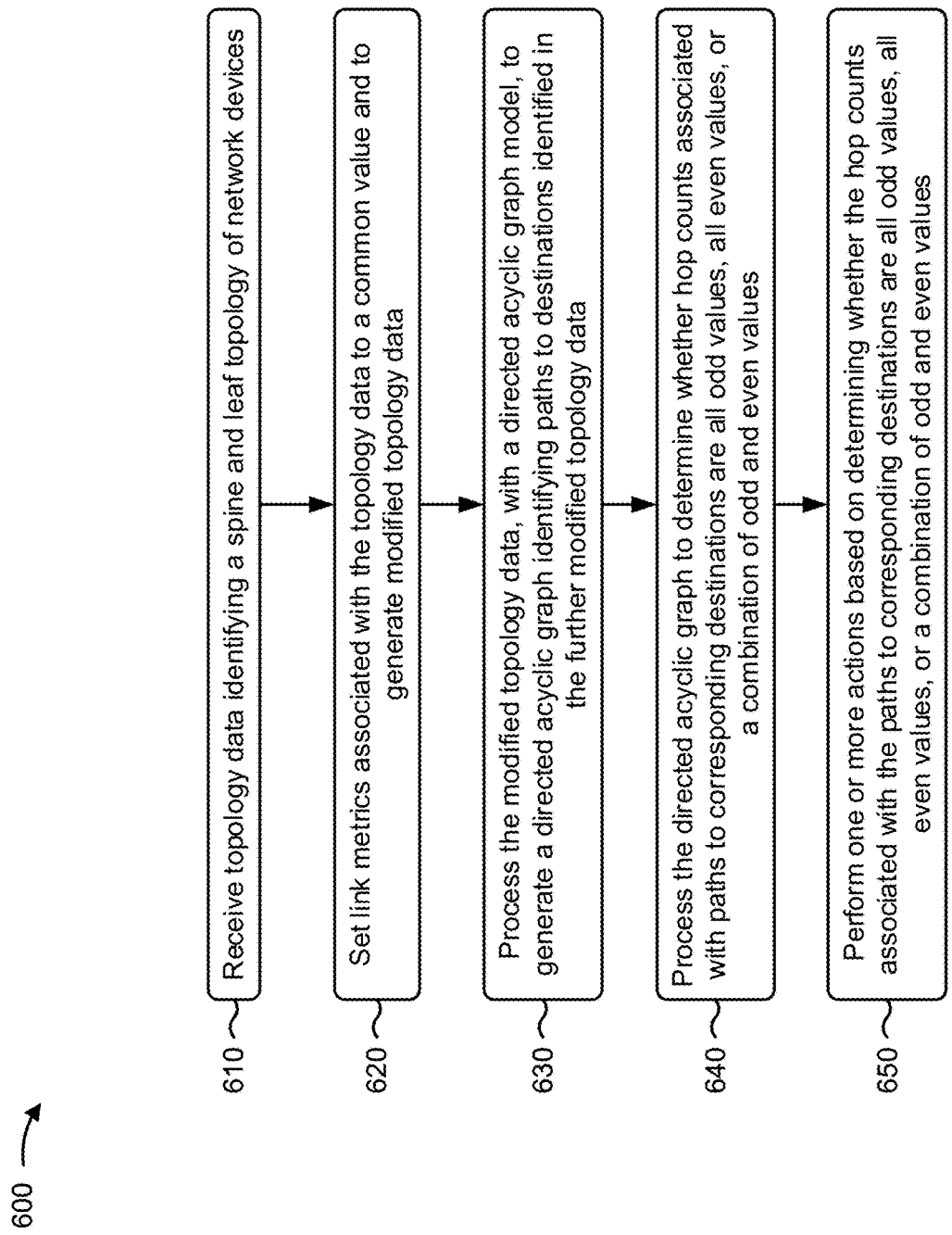

FIG. 6 is a flow chart of an example process 600 for detecting miswirings in a spine and leaf topology of network devices. In some implementations, one or more process blocks of FIG. 6 may be performed by a device (e.g., network device 220). In some implementations, one or more process blocks of FIG. 6 may be performed by another device or a group of devices separate from or including the device, such as an endpoint device (e.g., endpoint device 210).

As shown in FIG. 6, process 600 may include receiving topology data identifying a spine and leaf topology of network devices (block 610). For example, the device (e.g., using input component 305, switching component 310, controller 320, processor 420, communication interface 470, and/or the like) may receive topology data identifying a spine and leaf topology of network devices, as described above.

As further shown in FIG. 6, process 600 may include setting link metrics associated with the topology data to a common value and to generate modified topology data (block 620). For example, the device (e.g., using switching component 310, controller 320, processor 420, memory 430, and/or the like) may set link metrics associated with the topology data to a common value and to generate modified topology data, as described above.

As further shown in FIG. 6, process 600 may include processing the modified topology data, with a directed acyclic graph model, to generate a directed acyclic graph identifying paths to destinations identified in the further modified topology data (block 630). For example, the device (e.g., using switching component 310, controller 320, processor 420, memory 430, and/or the like) may process the modified topology data, with a directed acyclic graph model, to generate a directed acyclic graph identifying paths to destinations identified in the further modified topology data, as described above.

As further shown in FIG. 6, process 600 may include processing the directed acyclic graph to determine whether hop counts associated with paths to corresponding destinations are all odd values, all even values, or a combination of odd and even values (block 640). For example, the device (e.g., using switching component 310, controller 320, processor 420, storage component 440, and/or the like) may process the directed acyclic graph to determine whether hop counts associated with paths to corresponding destinations are all odd values, all even values, or a combination of odd and even values, as described above.

As further shown in FIG. 6, process 600 may include performing one or more actions based on determining whether the hop counts associated with the paths to corresponding destinations are all odd values, all even values, or a combination of odd and even values (block 650). For example, the device (e.g., using switching component 310, output component 315, controller 320, processor 420, memory 430, storage component 440, communication interface 470, and/or the like) may perform one or more actions based on determining whether the hop counts associated with the paths to corresponding destinations are all odd values, all even values, or a combination of odd and even values, as described above.

Process 600 may include additional implementations, such as any single implementation or any combination of implementations described below and/or in connection with one or more other processes described elsewhere herein.

In a first implementation, process 600 includes determining there are not miswirings in the spine and leaf topology of network devices when the hop counts associated with the paths to corresponding destinations are determined to be all odd values or all even values.

In a second implementation, alone or in combination with the first implementation, process 600 includes determining there are one or more miswirings in the spine and leaf topology of network devices when the hop counts associated with the paths to corresponding destinations are determined to be a combination of odd and even values.

In a third implementation, alone or in combination with one or more of the first and second implementations, performing the one or more actions includes providing, to an endpoint device, an alert identifying one or more miswirings in the spine and leaf topology of network devices when the one or more miswirings are identified based on determining whether the hop counts associated with the paths to corresponding destinations are all odd values, all even values, or a combinations of odd and even values; automatically dispatching a technician to correct the one or more miswirings in the spine and leaf topology of network devices when the one or more miswirings are identified based on determining whether the hop counts associated with the paths to corresponding destinations are all odd values, all even values, or a combination of odd and even values; or automatically dispatching a robot or an autonomous vehicle to correct the one or more miswirings in the spine and leaf topology of network devices when the one or more miswirings are identified based on determining whether the hop counts associated with the paths to corresponding destinations are all odd values, all even values, or a combination of odd and even values.

In a fourth implementation, alone or in combination with one or more of the first through third implementations, performing the one or more actions includes providing data identifying one or more miswirings in the spine and leaf topology of network devices to a log file when the one or more miswirings are identified based on determining whether the hop counts associated with the paths to corresponding destinations are all odd values, all even values, or a combination of odd and even values; providing data identifying one or more miswirings in the spine and leaf topology of network devices to a tool that determines physical locations of the one or more miswirings when the one or more miswirings are identified based on determining whether the hop counts associated with the paths to corresponding destinations are all odd values, all even values, or a combination of odd and even values; or performing one or more tests on the spine and leaf topology based on one or more miswirings in the spine and leaf topology of network devices when the one or more miswirings are identified based on determining whether the hop counts associated with the paths to corresponding destinations are all odd values, all even values, or a combination of odd and even values.

In a fifth implementation, alone or in combination with one or more of the first through fourth implementations, process 600 includes providing, to an endpoint device, a notification indicating no miswirings in the spine and leaf topology of network devices when no miswirings are identified based on determining whether the hop counts associated with paths to corresponding destinations are all odd values, all even values, or a combination of odd and even values.

In a sixth implementation, alone or in combination with one or more of the first through fifth implementations, a stage of network devices of the spine and leaf topology is connected to a next stage of network devices and network devices of the stage are not interconnected.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for detecting miswirings in a spine and leaf topology of network devices. In some implementations, one or more process blocks of FIG. 7 may be performed by a device (e.g., network device 220). In some implementations, one or more process blocks of FIG. 7 may be performed by another device or a group of devices separate from or including the device, such as an endpoint device (e.g., endpoint device 210).

As shown in FIG. 7, process 700 may include receiving topology data identifying a spine and leaf topology of network devices, wherein the network device is included in the spine and leaf topology of network devices (block 710). For example, the device (e.g., using input component 305, switching component 310, controller 320, processor 420, communication interface 470, and/or the like) may receive topology data identifying a spine and leaf topology of network devices, as described above. In some implementations, the network device is included in the spine and leaf topology of network devices.

As further shown in FIG. 7, process 700 may include setting link metrics associated with the topology data to a common value and to generate modified topology data (block 720). For example, the device (e.g., using switching component 310, controller 320, processor 420, memory 430, and/or the like) may set link metrics associated with the topology data to a common value and to generate modified topology data, as described above.

As further shown in FIG. 7, process 700 may include processing the modified topology data, with a shortest path first model, to determine path data identifying paths to destinations identified in the modified topology data (block 730). For example, the device (e.g., using switching component 310, controller 320, processor 420, memory 430, and/or the like) may process the modified topology data, with a shortest path first model, to determine path data identifying paths to destinations identified in the modified topology data, as described above.

As further shown in FIG. 7, process 700 may include processing the path data and the modified topology data, with the shortest path first model, to determine particular path data identifying at least one shorter path and at least one longer path to a corresponding destination (block 740). For example, the device (e.g., using switching component 310, controller 320, processor 420, storage component 440, and/or the like) may process the path data and the modified topology data, with the shortest path first model, to determine particular path data identifying at least one shorter path and at least one longer path to a corresponding destination, as described above.

As further shown in FIG. 7, process 700 may include processing the particular path data and the modified topology data, with the shortest path first model, to determine hop counts associated with the at least one shorter path and the at least one longer path to the corresponding destination (block 750). For example, the device (e.g., using switching component 310, controller 320, processor 420, memory 430, and/or the like) may process the particular path data and the modified topology data, with the shortest path first model, to determine hop counts associated with the at least one shorter path and the at least one longer path to the corresponding destination, as described above.

As further shown in FIG. 7, process 700 may include processing with the shortest path first model, to determine whether the hop counts associated with the at least one shorter path and the at least one longer path to the corresponding destination are all odd values, all even values, or a combination of odd and even values (block 760). For example, the device (e.g., using switching component 310, controller 320, processor 420, storage component 440, and/or the like) may process with the shortest path first model, to determine whether the hop counts associated with the at least one shorter path and the at least one longer path to the corresponding destination are all odd values, all even values, or a combination of odd and even values, as described above.

As further shown in FIG. 7, process 700 may include determining whether there are one or more miswirings in the spine and leaf topology of network devices based on determining whether the hop counts associated with the at least one shorter path and the at least one longer path to the corresponding destination are all odd values, all even values, or a combination of odd and even values (block 770). For example, the device (e.g., using switching component 310, controller 320, processor 420, memory 430, and/or the like) may determine whether there are one or more miswirings in the spine and leaf topology of network devices based on determining whether the hop counts associated with the at least one shorter path and the at least one longer path to the corresponding destination are all odd values, all even values, or a combination of odd and even values, as described above.

As further shown in FIG. 7, process 700 may include performing one or more actions based on determining whether there are one or more miswirings in the spine and leaf topology of network devices (block 780). For example, the device (e.g., using switching component 310, output component 315, controller 320, processor 420, memory 430, storage component 440, communication interface 470, and/or the like) may perform one or more actions based on determining whether there are one or more miswirings in the spine and leaf topology of network devices, as described above.

Process 700 may include additional implementations, such as any single implementation or any combination of implementations described below and/or in connection with one or more other processes described elsewhere herein.

In a first implementation, process 700 includes determining there are not miswirings in the spine and leaf topology of network devices when the hop counts associated with the at least one shorter path and the at least one longer path to the corresponding destination are determined to be all odd values or all even values.

In a second implementation, alone or in combination with the first implementation, process 700 includes determining there are one or more miswirings in the spine and leaf topology of network devices when the hop counts associated with the at least one shorter path and the at least one longer path to the corresponding destination are determined to be a combination of odd and even values.

In a third implementation, alone or in combination with one or more of the first and second implementations, performing the one or more actions includes providing, to an endpoint device, an alert identifying one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values; automatically dispatching a technician to correct one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values; or automatically dispatching a robot or an autonomous vehicle to correct one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values.

In a fourth implementation, alone or in combination with one or more of the first through third implementations, performing the one or more actions includes providing data identifying one or more miswirings in the spine and leaf topology of network devices to a log file when the one or more miswirings are identified based on determining whether the hop counts associated with the at least one shorter path and the at least one longer path to the corresponding destination are all odd values, all even values, or a combination of odd and even values; providing data identifying one or more miswirings in the spine and leaf topology of network devices to a tool that determines physical locations of the one or more miswirings when the one or more miswirings are identified based on determining whether the hop counts associated with the at least one shorter path and the at least one longer path to the corresponding destination are all odd values, all even values, or a combination of odd and even values; or performing one or more tests on the spine and leaf topology based on one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values.

In a fifth implementation, alone or in combination with one or more of the first through fourth implementations, process 700 includes processing the particular path data and the modified topology data, with the shortest path first model, to discard the at least one longer path to the corresponding destination and to generate shortest path topology data identifying the at least one shorter path to the corresponding destination in the spine and leaf topology.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, topology data identifying a spine and leaf topology of network devices,
       wherein the network device is included in the spine and leaf topology of network devices;
   setting, by the network device, link metrics associated with the topology data to a common value and to generate modified topology data;
   removing, by the network device, data identifying connections from leaf network devices to any devices outside the spine and leaf topology from the modified topology data to generate further modified topology data;
   processing, by the network device, the further modified topology data, with a shortest path first model, to determine path data identifying paths to destinations identified in the further modified topology data;
   processing, by the network device, the path data and the further modified topology data, with the shortest path first model, to determine particular path data identifying shorter paths and longer paths to corresponding destinations;
   processing, by the network device, the particular path data and the further modified topology data, with the shortest path first model, to determine hop counts associated with the shorter paths and the longer paths to corresponding destinations;
   processing, by the network device, the hop counts, with the shortest path first model, to determine whether the hop counts associated with the shorter paths and the longer paths to corresponding destinations are all odd values, all even values, or a combination of odd and even values,
       wherein processing the hop counts with the shortest path first model comprises:
           comparing the hop counts of different possible paths to reach a particular destination, of the corresponding destinations, to determine whether the hop counts from the different possible paths are all odd values, all even values, or are a combination of odd and even values; and
   performing, by the device, one or more actions based on determining whether the hop counts associated with the shorter paths and the longer paths to corresponding destinations are all odd values, all even values, or a combination of odd and even values,
       wherein performing the one or more actions comprises:
           performing a first action, of the one or more actions, based on whether the hop counts associated with the shorter paths and the longer paths to corresponding destinations are determined to be all odd values or all even values, or
           performing a second action, of the one or more actions, based on whether the hop counts associated with the shorter paths and the longer paths to corresponding destinations are determined to be a combination of odd values and even values.

2. The method of claim 1, wherein performing the one or more actions comprises:
   determining there are not miswirings in the spine and leaf topology of network devices when the hop counts associated with the shorter paths and the longer paths to corresponding destinations are determined to be all odd values or all even values.

3. The method of claim 1, wherein performing the one or more actions comprises:
   determining there is at least one miswiring in the spine and leaf topology of network devices when the hop counts associated with the shorter paths and the longer paths to corresponding destinations are determined to be a combination of odd and even values.

4. The method of claim 1, wherein performing the one or more actions comprises one or more of:
   providing an alert identifying a miswiring in the spine and leaf topology of network devices to an endpoint device when the miswiring is identified based on determining whether the hop counts associated with the shorter paths and the longer paths to corresponding destinations are all odd values, all even values, or a combination of odd and even values;
   automatically dispatching a technician to correct a miswiring in the spine and leaf topology of network devices when the miswiring is identified based on determining whether the hop counts associated with the shorter paths and the longer paths to corresponding destinations are all odd values, all even values, or a combination of odd and even values; or
   automatically dispatching a robot or an autonomous vehicle to correct a miswiring in the spine and leaf topology of network devices when the miswiring is identified based on determining whether the hop counts associated with the shorter paths and the longer paths to corresponding destinations are all odd values, all even values, or a combination of odd and even values.

5. The method of claim 1, wherein performing the one or more actions comprises one or more of:
   providing data identifying a miswiring in the spine and leaf topology of network devices in a log file when the miswiring is identified based on determining whether the hop counts associated with the shorter paths and the longer paths to corresponding destinations are all odd values, all even values, or a combination of odd and even values;
   providing data identifying a miswiring in the spine and leaf topology of network devices to a tool that determines physical locations of the miswiring when the miswiring is identified based on determining whether the hop counts associated with the shorter paths and the longer paths to corresponding destinations are all odd values, all even values, or a combination of odd and even values; or
   performing one or more tests on the spine and leaf topology based on a miswiring in the spine and leaf topology of network devices when the miswiring is identified based on determining whether the hop counts associated with the shorter paths and the longer paths to corresponding destinations are all odd values, all even values, or a combination of odd and even values.

6. The method of claim 1, further comprising:
processing the particular path data and the further modified topology data, with the shortest path first model, to discard the longer paths to corresponding destinations and to generate shortest path topology data identifying the shorter paths to corresponding destinations in the spine and leaf topology.

7. The method of claim 1, wherein a stage of network devices of the spine and leaf topology is connected to a next stage of network devices and network devices of the stage are not interconnected.

8. A device, comprising:
one or more memories; and
one or more processors to:
receive topology data identifying a spine and leaf topology of network devices;
set link metrics associated with the topology data to a common value and to generate modified topology data;
process the modified topology data, with a directed acyclic graph model, to generate a directed acyclic graph identifying paths to destinations identified in the modified topology data;
process the directed acyclic graph to determine whether hop counts associated with paths to corresponding destinations are all odd values, all even values, or a combination of odd and even values,
wherein the one or more processors, to process the directed acyclic graph, are to:
compare the hop counts of different possible paths to reach a particular destination, of the corresponding destinations, to determine whether the hop counts from the different possible paths are all odd values, all even values, or are a combination of odd and even values; and
perform one or more actions based on determining whether the hop counts associated with the paths to corresponding destinations are all odd values, all even values, or a combination of odd and even values,
wherein the one or more processors, to perform the one or more actions, are to:
perform a first action, of the one or more actions, based on whether the hop counts associated with the paths to corresponding destinations are determined to be all odd values or all even values, or
perform a second action, of the one or more actions, based on whether the hop counts associated with the paths to corresponding destinations are determined to be a combination of odd values and even values.

9. The device of claim 8, wherein the one or more processors, when performing the one or more actions, are to:
determine there are not miswirings in the spine and leaf topology of network devices when the hop counts associated with the paths to corresponding destinations are determined to be all odd values or all even values.

10. The device of claim 8, wherein the one or more processors, when performing the one or more actions, are configured to:
determine there are one or more miswirings in the spine and leaf topology of network devices when the hop counts associated with the paths to corresponding destinations are determined to be a combination of odd and even values.

11. The device of claim 8, wherein the one or more processors, when performing the one or more actions, are configured to one or more of:
provide, to an endpoint device, an alert identifying one or more miswirings in the spine and leaf topology of network devices when the one or more miswirings are identified based on determining whether the hop counts associated with the paths to corresponding destinations are all odd values, all even values, or a combinations of odd and even values;
automatically dispatch a technician to correct miswirings in the spine and leaf topology of network devices when the one or more miswirings are identified based on determining whether the hop counts associated with the paths to corresponding destinations are all odd values, all even values, or a combination of odd and even values; or
automatically dispatch a robot or an autonomous vehicle to correct the one or more miswirings in the spine and leaf topology of network devices when the one or more miswirings are identified based on determining whether the hop counts associated with the paths to corresponding destinations are all odd values, all even values, or a combination of odd and even values.

12. The device of claim 8, wherein the one or more processors, when performing the one or more actions, are configured to one or more of:
provide data identifying one or more miswirings in the spine and leaf topology of network devices to a log file when the one or more miswirings are identified based on determining whether the hop counts associated with the paths to corresponding destinations are all odd values, all even values, or a combination of odd and even values;
provide data identifying the one or more miswirings in the spine and leaf topology of network devices to a tool that determines physical locations of the one or more miswirings when the one or more miswirings are identified based on determining whether the hop counts associated with the paths to corresponding destinations are all odd values, all even values, or a combination of odd and even values; or
perform one or more tests on the spine and leaf topology based on the one or more miswirings in the spine and leaf topology of network devices when the one or more miswirings are identified based on determining whether the hop counts associated with the paths to corresponding destinations are all odd values, all even values, or a combination of odd and even values.

13. The device of claim 8, wherein the one or more processors, when performing the one or more actions, are configured to:
provide, to an endpoint device, a notification indicating no miswirings in the spine and leaf topology of network devices when no miswirings are identified based on determining whether the hop counts associated with the paths to corresponding destinations are all odd values, all even values, or a combination of odd and even values.

14. The device of claim 8, wherein a stage of network devices of the spine and leaf topology is connected to a next stage of network devices and network devices of the stage are not interconnected.

15. A non-transitory computer-readable medium storing instructions, the instructions comprising:
one or more instructions that, when executed by one or more processors of a network device, cause the one or more processors to:
receive topology data identifying a spine and leaf topology of network devices,
wherein the network device is included in the spine and leaf topology of network devices;
set link metrics associated with the topology data to a common value and to generate modified topology data;
process the modified topology data, with a shortest path first model, to determine path data identifying paths to destinations identified in the modified topology data;
process the path data and the modified topology data, with the shortest path first model, to determine particular path data identifying at least one shorter path and at least one longer path to a corresponding destination;
process the particular path data and the modified topology data, with the shortest path first model, to determine hop counts associated with the at least one shorter path and the at least one longer path to the corresponding destination;
process with the shortest path first model, to determine whether the hop counts associated with the at least one shorter path and the at least one longer path to the corresponding destination are all odd values, all even values, or a combination of odd and even values;
determine whether there are one or more miswirings in the spine and leaf topology of network devices based on determining whether the hop counts associated with the at least one shorter path and the at least one longer path to the corresponding destination are all odd values, all even values, or a combination of odd and even values,
wherein the one or more instructions, that cause the one or more processors to determine whether there are one or more miswirings, cause the one or more processors to:
compare the hop counts of different possible paths to reach a particular destination, of the corresponding destinations, to determine whether the hop counts from the different possible paths are all odd values, all even values, or are a combination of odd and even values; and
perform one or more actions based on determining whether there are one or more miswirings in the spine and leaf topology of network devices,
wherein the one or more instructions, that cause the one or more processors to, perform the one or more actions, cause the one or more processors to:
perform a first action, of the one or more actions, based on whether the hop counts associated with the at least one shorter path and the at least one longer path to the corresponding the destination are determined to be all odd values, or
perform a second action, of the one or more actions, based on whether the hop counts associated with the at least one shorter path and the at least one longer path to the corresponding destination are determined to be both odd values and even values.

16. The non-transitory computer-readable medium of claim 15, wherein the one or more instructions, that cause the one or more processors to determine whether there are one or more miswirings in the spine and leaf topology of network devices, cause the one or more processors to:
determine there are not miswirings in the spine and leaf topology of network devices when the hop counts associated with the at least one shorter path and the at least one longer path to the corresponding destination are determined to be all odd values or all even values.

17. The non-transitory computer-readable medium of claim 15, wherein the one or more instructions, that cause the one or more processors to determine whether there are one or more miswirings in the spine and leaf topology of network devices, cause the one or more processors to:
determine there is at least one miswiring in the spine and leaf topology of network devices when the hop counts associated with the at least one shorter path and the at least one longer path to the corresponding destination are determined to be a combination of odd and even values.

18. The non-transitory computer-readable medium of claim 15, wherein the one or more instructions, that cause the one or more processors to perform the one or more actions, cause the one or more processors to one or more of:
provide, to an endpoint device, an alert identifying one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values;
automatically dispatch a technician to correct the one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values; or
automatically dispatch a robot or an autonomous vehicle to correct the one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values.

19. The non-transitory computer-readable medium of claim 15, wherein the one or more instructions, that cause the one or more processors to perform the one or more actions, cause the one or more processors to one or more of:
provide data identifying one or more miswirings in the spine and leaf topology of network devices to a log file when the one or more miswirings are identified based on determining whether the hop counts associated with the at least one shorter path and the at least one longer path to the corresponding destination are all odd values, all even values, or a combination of odd and even values;
provide data identifying the one or more miswirings in the spine and leaf topology of network devices to a tool that determines physical locations of the one or more miswirings when the one or more miswirings are identified based on determining whether the hop counts associated with the at least one shorter path and the at least one longer path to the corresponding destination are all odd values, all even values, or a combination of odd and even values; or perform one or more tests on the spine and leaf topology based on the one or more miswirings in the spine and leaf topology of network devices when the one or more miswirings are identified based on determining whether the hop counts associated with the at least one shorter path and the at least one longer path to the corresponding destination are all odd values, all even values, or a combination of odd and even values.

20. The non-transitory computer-readable medium of claim 15, wherein the one or more instructions, when executed by the one or more processors, further cause the one or more processors to:

process the particular path data and the modified topology data, with the shortest path first model, to discard the at least one longer path to the corresponding destination and to generate shortest path topology data identifying the at least one shorter path to the corresponding destination in the spine and leaf topology.

* * * * *